(12) United States Patent
Tilleman

(10) Patent No.: US 10,609,266 B2
(45) Date of Patent: Mar. 31, 2020

(54) CAMERA FOR WIDE FIELD OF VIEW WITH AN ARBITRARY ASPECT RATIO

(71) Applicant: Rockwell Automation Technologies, Inc., Mayfield Heights, OH (US)

(72) Inventor: Michael M. Tilleman, Brookline, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 6 days.

(21) Appl. No.: 16/107,099

(22) Filed: Aug. 21, 2018

(65) Prior Publication Data

US 2020/0068102 A1   Feb. 27, 2020

(51) Int. Cl.
| | |
|---|---|
| *H04N 5/225* | (2006.01) |
| *G02B 13/00* | (2006.01) |
| *G02B 13/06* | (2006.01) |
| *G08B 13/196* | (2006.01) |

(52) U.S. Cl.
CPC ....... *H04N 5/2256* (2013.01); *G02B 13/0045* (2013.01); *G02B 13/06* (2013.01); *G08B 13/19628* (2013.01); *H04N 5/22541* (2018.08)

(58) Field of Classification Search
None
See application file for complete search history.

(56) References Cited

U.S. PATENT DOCUMENTS

| | | |
|---|---|---|
| 5,235,467 A | 8/1993 | Nagamachi |
| 5,450,378 A | 9/1995 | Hekker |
| 5,612,821 A | 3/1997 | Schmutz |
| 5,717,455 A * | 2/1998 | Kamewada ........ G02B 23/2415 348/85 |

(Continued)

FOREIGN PATENT DOCUMENTS

| | | |
|---|---|---|
| CN | 1693986 A | 11/2005 |
| CN | 1886981 A | 12/2006 |

(Continued)

OTHER PUBLICATIONS

European Search Report for European Patent Application No. 16182180.6-1562 dated Feb. 10, 2017, 7 pages.

(Continued)

*Primary Examiner* — Quan Pham
(74) *Attorney, Agent, or Firm* — Amin, Turocy & Watson, LLP

(57) ABSTRACT

A camera system comprises illumination and optical components that manage illumination from the illumination source to the camera sensor in a highly efficient manner to image a wide field of view. The camera sensor comprises a modular compound imaging lens and a corresponding illuminator. The illuminator is capable of emitting a field of illumination that is wide in one plane (e.g., the tangential plane) and relatively narrow in the orthogonal plane (e.g., the sagittal plane). The modular compound lens receives scattered light from the viewing field and focuses the light to one or more imaging sensors (e.g., 3D imaging sensors). The modular lens images a wide field of view substantially equal to the field of illumination of the illuminator and is oriented such that the field of view of the lens substantially overlaps the field of illumination of the illuminator, yielding a high collection efficiency.

20 Claims, 26 Drawing Sheets

(56) References Cited

U.S. PATENT DOCUMENTS

| | | |
|---|---|---|
| 6,243,513 B1 | 6/2001 | Wade |
| 6,433,934 B1 | 8/2002 | Reznichenko et al. |
| 6,563,612 B1 | 5/2003 | Aye et al. |
| 6,583,937 B1 | 6/2003 | Wangler et al. |
| 6,611,382 B2 | 8/2003 | Hashimoto |
| 6,631,016 B1 | 10/2003 | Klug et al. |
| 6,830,189 B2 * | 12/2004 | Tsikos .................... B82Y 15/00 235/462.01 |
| 7,159,986 B2 | 1/2007 | Bremer et al. |
| 7,268,950 B2 | 9/2007 | Poulsen |
| 7,619,824 B2 | 11/2009 | Poulsen |
| 8,390,914 B2 | 3/2013 | Woodgate et al. |
| 8,908,159 B2 | 12/2014 | Mimeault |
| 9,344,705 B2 | 5/2016 | Oggier et al. |
| 9,360,762 B2 | 6/2016 | Tychkov |
| 9,696,427 B2 | 7/2017 | Wilson et al. |
| 2002/0024740 A1 | 2/2002 | Hashimoto |
| 2002/0043561 A1 | 4/2002 | Tsikos et al. |
| 2005/0237488 A1 | 10/2005 | Yamasaki |
| 2010/0283842 A1 | 11/2010 | Rami et al. |
| 2011/0058370 A1 * | 3/2011 | Datz .................... B60Q 1/2611 362/235 |
| 2012/0057345 A1 | 3/2012 | Kuchibhotla |
| 2013/0050405 A1 | 2/2013 | Kensuke, et al. |
| 2013/0242040 A1 | 9/2013 | Masuda et al. |
| 2015/0002664 A1 | 1/2015 | Andreas et al. |
| 2015/0287638 A1 | 10/2015 | Park et al. |
| 2017/0059838 A1 * | 3/2017 | Tilleman ............ G02B 19/0028 |
| 2017/0059858 A1 * | 3/2017 | Tilleman ............ H04N 5/23238 |

FOREIGN PATENT DOCUMENTS

| | | |
|---|---|---|
| CN | 101142806 A | 3/2008 |
| CN | 102681293 A | 9/2012 |
| CN | 104040370 A | 9/2014 |
| CN | 203892962 U | 10/2014 |
| CN | 104487803 A | 4/2015 |
| CN | 107065159 | 8/2017 |
| EP | 2466905 | 6/2012 |
| EP | 3 144 586 A2 | 3/2017 |

OTHER PUBLICATIONS

European Search Report for European Patent Application No. 16182177.2-1562 dated Feb. 2, 2017, 10 pages.

Notice of Allowance for U.S. Appl. No. 14/993,601, dated Jul. 25, 2017, 23 pages.

Extended European Search Report for European Patent Application No. 16182180.6-1562 dated May 23, 2017, 16 pages.

Office Action for U.S. Appl. No. 14/994,323 dated Jun. 16, 2017, 20 pages.

Bronzi et al., "Automotive Three-Dimensional Vision Through a Single-Photon Counting SPAD Camera", European Commission FP7-ICT Framework through the "MiSPiA" Project under G.A. 257646, 2015, 14 pages.

Non-Final Office Action received for U.S. Appl. No. 15/828,739 dated Apr. 17, 2019, 29 pages.

First Office Action received for Chinese Patent Application Serial No. 201610720777.4 dated May 28, 2018, 20 pages. (Including English Translation).

First Office Action received for Chinese Patent Application Serial No. 201610720432.9 dated May 30, 2018, 24 pages. (Including English Translation).

Communication pursuant to Article 94(3) EPC received for EP Patent Application Serial No. 16182177.2 dated Feb. 28, 2019, 4 pages.

Extended European Search Report received for EP Patent Application Serial No. 18209028.2 dated Apr. 9, 2019, 19 pages.

Communication pursuant to Rule 69 EPC received for EP Patent Application Serial No. 18209028.2 dated Jun. 11, 2019, 2 pages.

Communication pursuant to Article 94(3) EPC received for EP Patent Application Serial No. 16182177.2 dated Nov. 19, 2019, 4 pages.

* cited by examiner

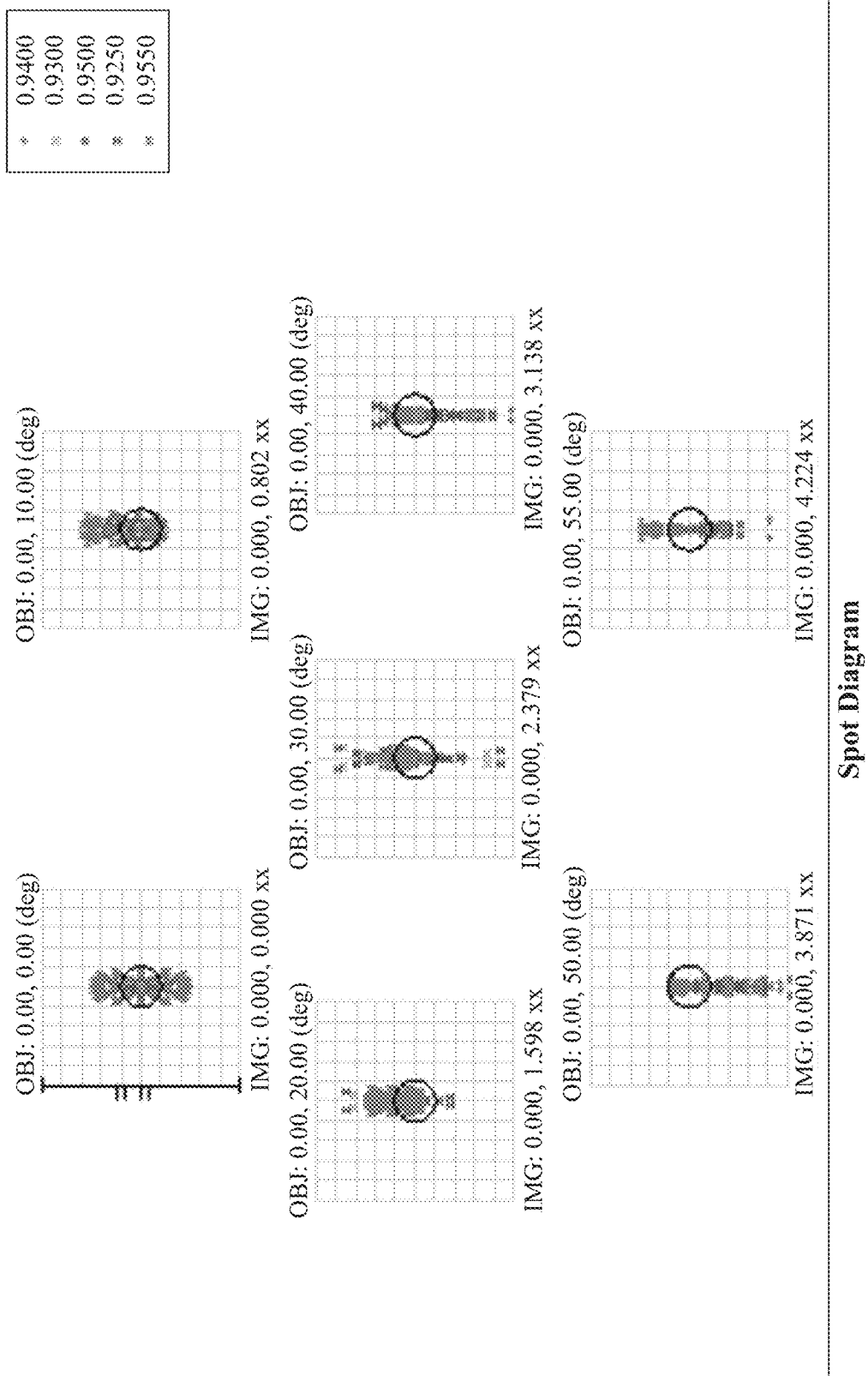

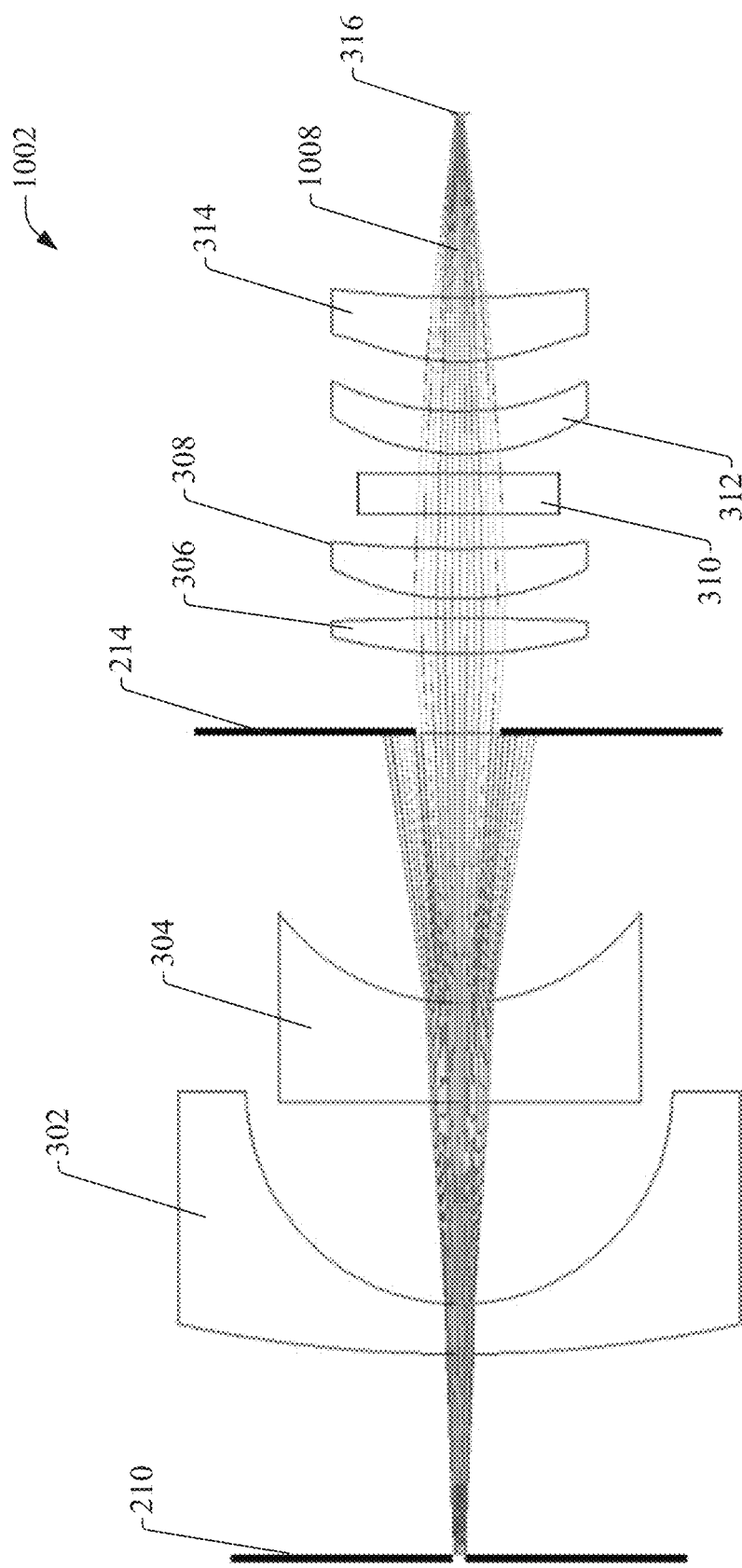

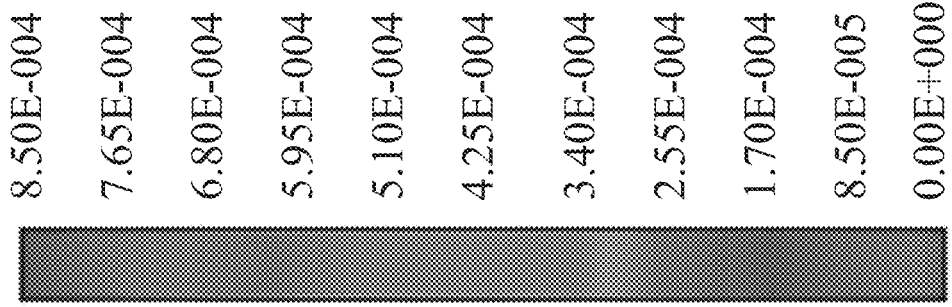
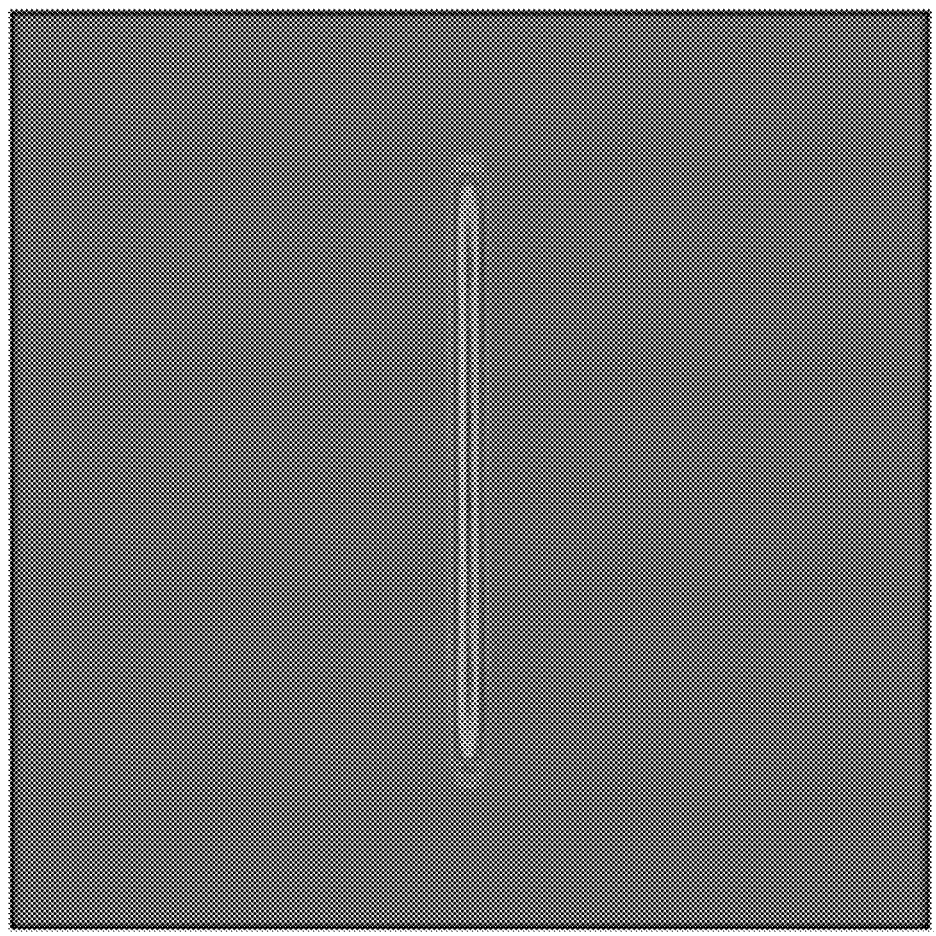
FIG. 13b

CAMERA FOR WIDE FIELD OF VIEW WITH AN ARBITRARY ASPECT RATIO

BACKGROUND

The subject matter disclosed herein relates generally to imaging systems, and, for example, to management of illumination from an illumination source to a camera sensor.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a system for imaging a field of view is provided comprising an illuminator comprising: a light source assembly, and an arched cylindrical lens that arches about an axis to yield a hollow cylindrical shape, wherein the arched cylindrical lens is refractive or diffractive, and the arched cylindrical lens is configured to collimate light from the light source assembly in a first plane and to allow undisturbed or substantially undisturbed propagation of the light in a second plane that is orthogonal to the first plane to yield an illumination beam; and a modular compound lens comprising: one or more frontal groups of optical components configured to collect and refract scattered light from respective one or more fields of view to yield refracted light, and a combining component configured receive the refracted light from the one or more frontal groups of optical elements and to direct the refracted light to one or more distal optical elements along an optical path of the modular compound lens.

Also, one or more embodiments provide method for imaging a field of view, comprising generating light by a light source assembly located at or near a focus of a curved profile of an arched cylindrical lens; receiving, by an arched cylindrical lens having a curved profile that arches about an axis, the light generated by the light source assembly, wherein the arched cylindrical lens is one of refractive or diffractive; collimating, by the arched cylindrical lens, the light in a first plane while allowing propagation of the light in a second plane that is orthogonal to the first plane to yield an illumination beam projected into a viewing space; receiving, by one or more frontal groups of optical components of a modular compound lens, a subset of the illumination beam as scattered light from the viewing space; refracting, by the one or more frontal groups of optical components, the scattered light to yield refracted light; receiving, by a combining component of the compound modular lens, the refracted light from the one or more frontal groups; and directing, by the combining component, the refracted light to one or more distal optical elements along an optical path of the modular compound lens.

Also, one or more embodiments provide a method of manufacturing an imaging sensor, comprising disposing a light source assembly at or near a focus of a curved profile of an arched cylindrical lens, wherein the arched cylindrical lens is one of refractive or diffractive and is configured to collimate light from the light source assembly in a first plane and to allow undisturbed or substantially undisturbed propagation of the light in a second plane that is orthogonal to the first plane to yield a field of illumination having a first angle; and orienting a modular compound lens to collect and refract scattered light from a field of view having a second angle that is equal to or substantially equal to the first angle of the field of illumination to yield refracted light and to direct the refracted light to one or more imaging sensors, wherein the orienting comprises orienting the modular compound lens to cause the field of view to substantially overlap with the field of illumination.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 4b is a plot of the spot diagram of an example modular compound lens.

FIG. 10 is a diagram of an example compound modular lens that includes a field aperture and a stop aperture to yield a field of view of 100×1.2.

FIG. 13b is a graph of the radiance of the illumination beam in the angular field.

DETAILED DESCRIPTION

Figure 1:
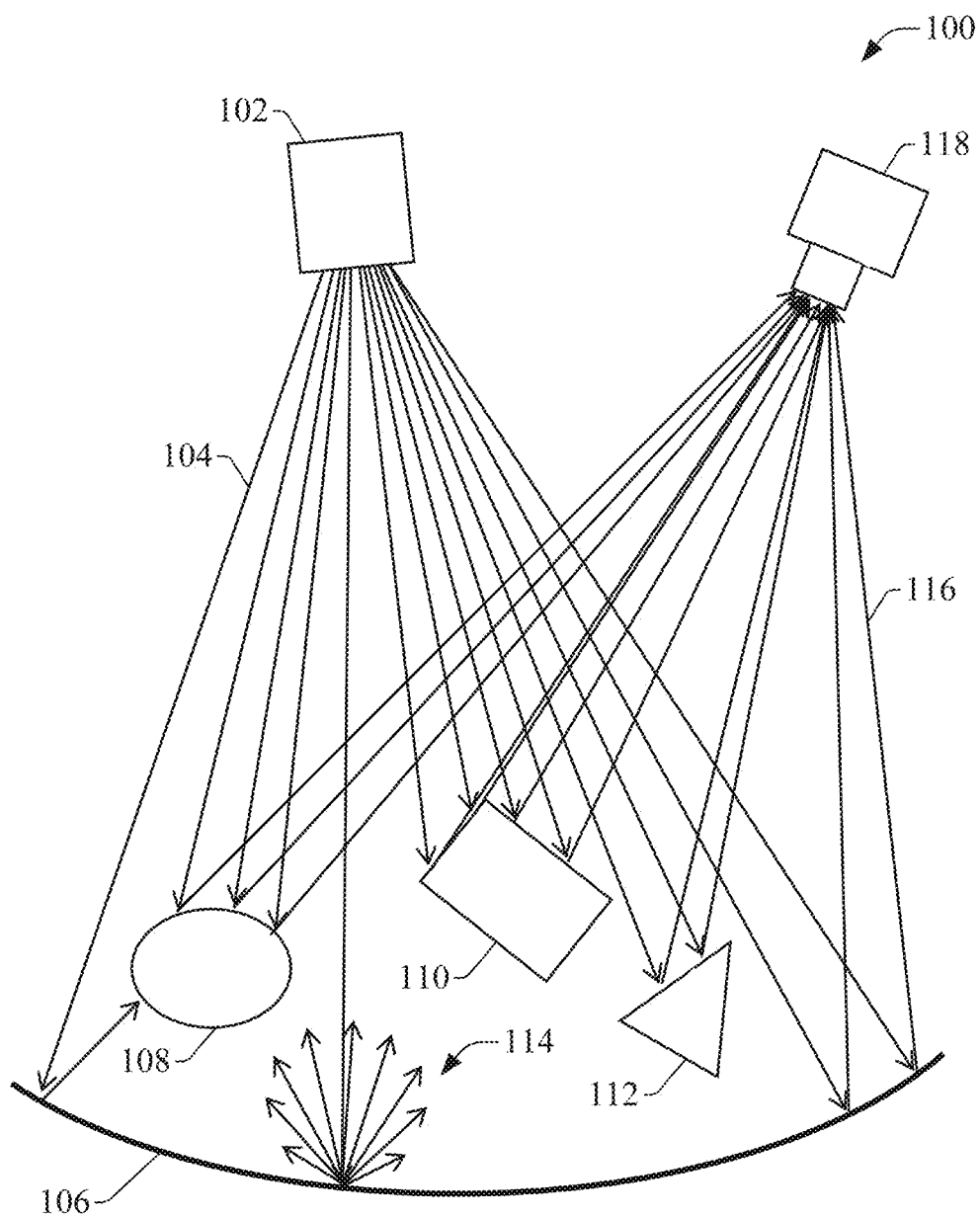
FIG. 1 is a diagram illustrating capture of an image by an example, non-limiting illumination and imaging system, which comprises an illuminator and an imaging system.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Also, the term "VCSEL" which is an abbreviation for "Vertical Cavity Surface Emitting Laser" is used for arrays of VCSELs. State-of-the-art VCSEL arrays can contain up to ten thousands of individual VCSELs.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Illumination systems are often used in conjunction with cameras or other types of imaging systems to properly illuminate areas in which ambient light is insufficient to allow the camera to produce an image with a desired contrast and signal-to-noise ratio. FIG. 1 is a diagram illustrating capture of an image by an example, non-limiting illumination and imaging system 100, which comprises an illuminator 102 and an imaging system 118. Illuminator 102 emits light 104 into a viewing area to be imaged. Portions of the emitted light that are incident on solid objects and surfaces within the field of view—such as solid bodies 108, 110, and 112 and wall 106—are scattered by the illuminated objects and surfaces as scattered rays 114. Subsets of the scattered rays 116 are received and collected by the imaging system 118, and image capturing components within the imaging system 118 (e.g., a photodiode array, a charged-coupled device, a complimentary metal-oxide semiconductor, photographic film or emulsion, etc.) record the rays 116 reflected from the objects and surfaces as an image (or as a set of point cloud data in the case of three-dimensional imaging systems).

Illuminator 102 and imaging system 118 can be, for example, components of a commercial camera or a more specialized camera such as a multi-spectral or hyper-spectral imaging camera. Imaging system 100 may also be components of a time-of-flight (TOF) camera (also known as a three-dimensional or 3D image sensor) capable of generating distance information for points within the viewing field, a process known as 3D imaging.

Illumination systems (such as illuminator 102) are typically designed to suit the requirements of a particular type of camera or imaging system. For example, commercial cameras are equipped with a relatively simple flash illuminator to compensate for a deficit of ambient light under dark conditions. More specialized cameras, such as those used for multi-spectral and hyper-spectral imaging, employ more specialized cameras designed to capture image information at specific electromagnetic frequencies, and therefore use illumination systems that generate light customized for the specific spectral ranges required.

Imaging in the three-dimensional space (3D imaging) requires the collection of many photo-electrons to accurately render the depth of an object, which can place great demands on the illumination system. Such imaging systems would benefit from an illumination system capable of forming an illumination field that overlaps the field-of-view of the imaging system effectively and prudently.

Cameras used in 3D imaging typically comprise compound lenses for imaging. The need for wide fields of view (FOV) and 3D imaging necessitates illumination of the FOV at high illuminance or irradiance levels. With regard to illumination, the quantity of illuminance pertains to the visible electromagnetic spectral range, while the quantity of irradiance refers to the range of the electromagnetic spectrum that is invisible to the human eye. As used herein, the term "illumination" refers to all processes and wavelengths for delivering electromagnetic radiation to a target FOV, and the term "irradiance" encompasses power density at any wavelength.

The modulation transfer function (MTF) of a lens represents the lateral spatial resolution and depth accuracy accounting for resolution in the third dimension of a 3D image produced by the lens, and is often considered a metric of quality of the 3D image. While the MTF corresponds to the contrast of the image or a fraction thereof, and is therefore a normalized quantity, the depth accuracy depends directly on the irradiance magnitude, which is typically a function of both the numerical strategies employed in the measurement of depth as well as by the need to overcome ambient light. For the latter reason an efficient and economical management of illumination and reception are of paramount importance.

One or more embodiments of the present disclosure provide a system and method for managing illumination from the illumination source (e.g., a flash or other type of illumination source) to the pixels of the camera sensor using a solitary modular compound imaging lens and a corresponding illuminator. In one or more embodiments, the illuminator of the camera system emits a field of illumination (FOI) that is wide in one plane (e.g., the tangential plane) and relatively narrow in the orthogonal plane (e.g., the sagittal plane). The modular compound lens receives scattered light from the viewing field and focuses the light to one or more imaging sensors (e.g., 3D imaging sensors). The modular lens images a wide field of view that is substantially equal to the field of illumination of the illuminator and is oriented such that the field of view of the lens substantially overlaps the field of illumination of the illuminator, yielding a high collection efficiency.

As noted above, while the MTF corresponds to the lateral contrast of the image or a fraction thereof, and is therefore a normalized quantity, the accuracy with which depth of an image can be resolved depends directly on the irradiance magnitude. On one hand, this constrains the imaging lens to MTF values greater than the MTF for the sensor 218, a highly uniform relative illumination, and low F-number. On the other hand, since an accuracy of a depth or distance measurement for a given pixel of sensor 218 depends on the number of photo-electrons accumulated in the pixel, and hence to the photon flux incident on the pixel, this requires an intense power illuminator that emits a beam that snugly subtends the FOV, with a well homogenized irradiance over the FOV. Embodiments of the imaging systems and associated components described herein are capable of satisfying these design parameters.

Figure 2:
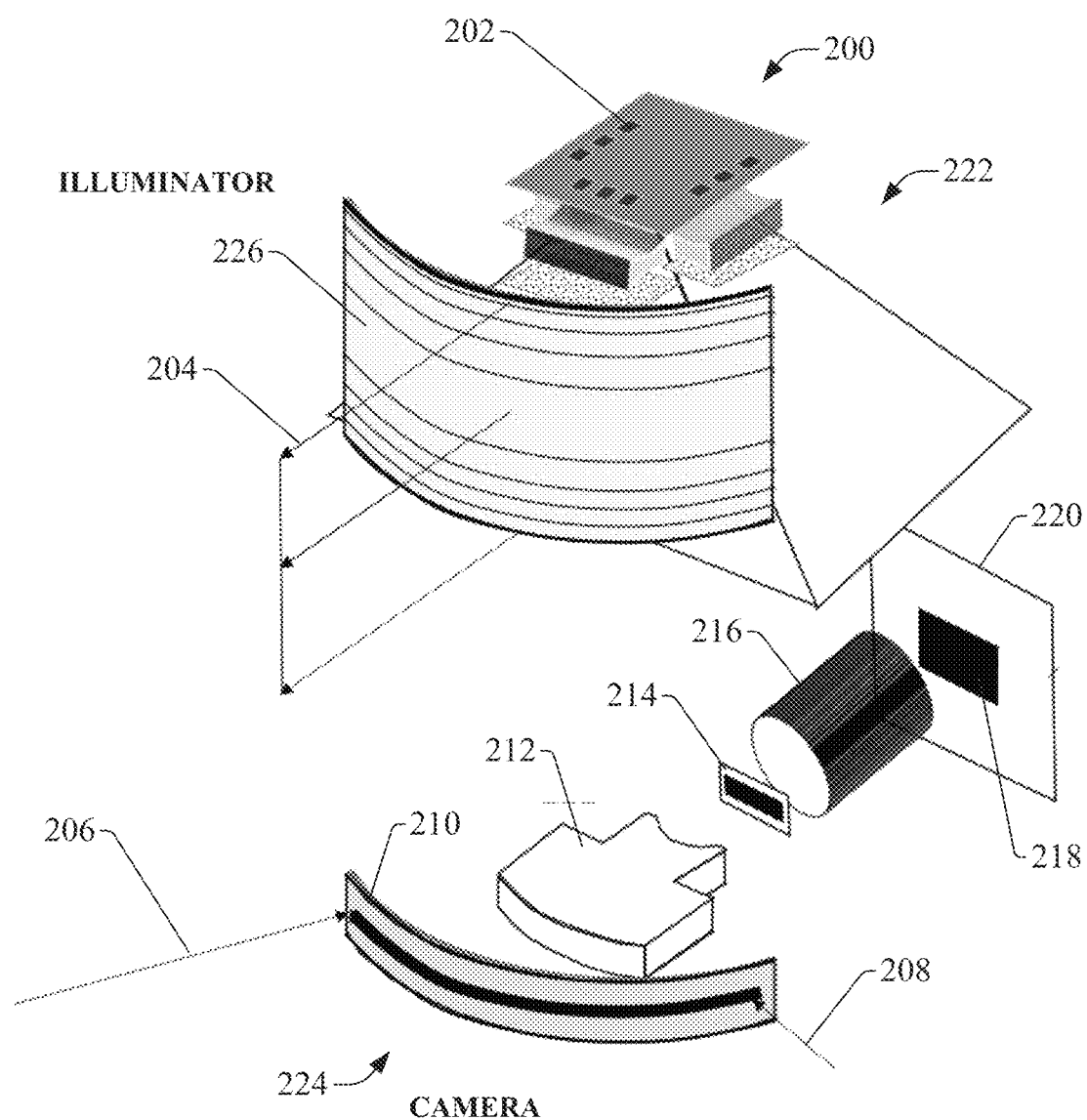
FIG. 2 is an exploded view of an example system comprising a 3D camera and its corresponding illuminator.

FIG. 2 is a schematic of an example system 200 comprising a 3D camera 224 and its corresponding illuminator 222 according to one or more embodiments. In this example embodiment, illuminator 202 emits rays 204 that are substantially collimated in the sagittal plane and substantially expanding in the tangential plane using lens 226. Camera 224 collects rays 206 and 208—which may be reflected and scattered rays 204 emitted by illuminator 222—from the field-of-view that are incident on a field stop 210 (although only two rays are shown for clarity, rays 206 and 208 represent a subset of all rays received at the field stop 210). The received rays 206 and 208 are refracted toward a frontal lens group 212 of the camera 224, and then pass through an aperture stop 214 toward a distal lens group 216. Distal lens group 216 passes the rays to a sensor 218 (mounted on printed circuit board 220 in the illustrated example) that is deposited in the focal plane, thereby imaging an object in the field-of-view onto the sensor 218.

Figure 3:
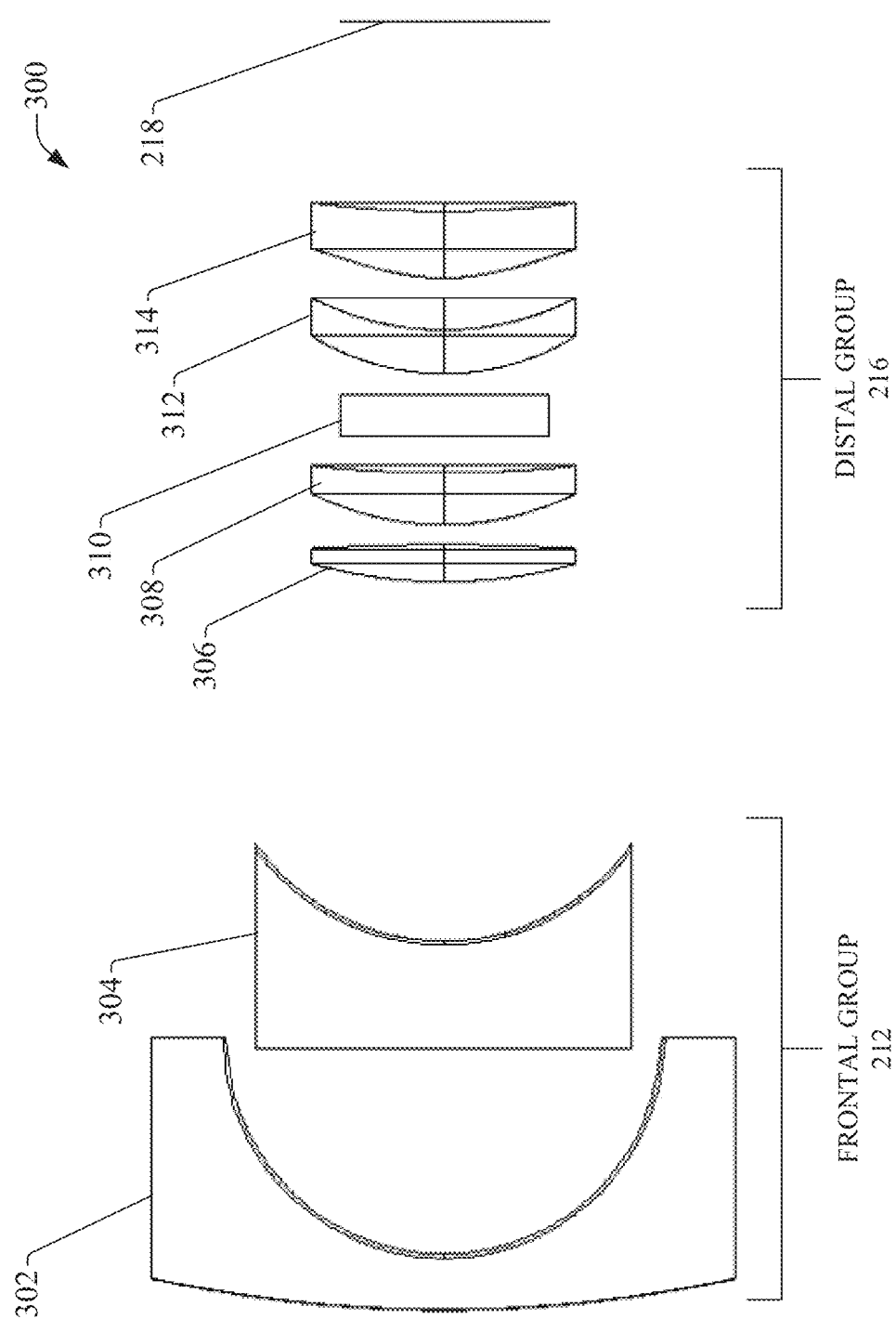
FIG. 3 is a diagram of a modular compound lens comprising frontal and distal lens groups.

FIG. 3 is a diagram of a modular compound lens 300 that can be used in camera 224 as lens groups 212 and 216. Modular compound lens 300 comprises several dioptrically powered elements and an unpowered optical filter. In the illustrated example, lens 300 comprises a primary lens 302, a secondary lens 304, a tertiary lens 306, a quaternary lens 308, a bandpass filter 310 (the unpowered optical filter) configured to reject ambient background radiation, a quinary lens 312, and a senary lens 314. In an example implementation, primary lens 302 and secondary lens 304 can make up frontal lens group 212 of camera 224, while tertiary lens 306, quaternary lens 308, bandpass filter 310, quinary lens 312, and a senary lens 314 can make up distal lens group 216 of camera 224. In some embodiments, the lenses of the frontal group 212 and distal group 216 can be made of polymers. In an example of such embodiments, the primary lens 302 and tertiary lens 306 may comprise polycarbonate, while the remaining lenses may comprise Zeonex. Also, in some embodiments the unpowered element—bandpass filter 310—may be a bandpass spectral filter.

Figure 4A:
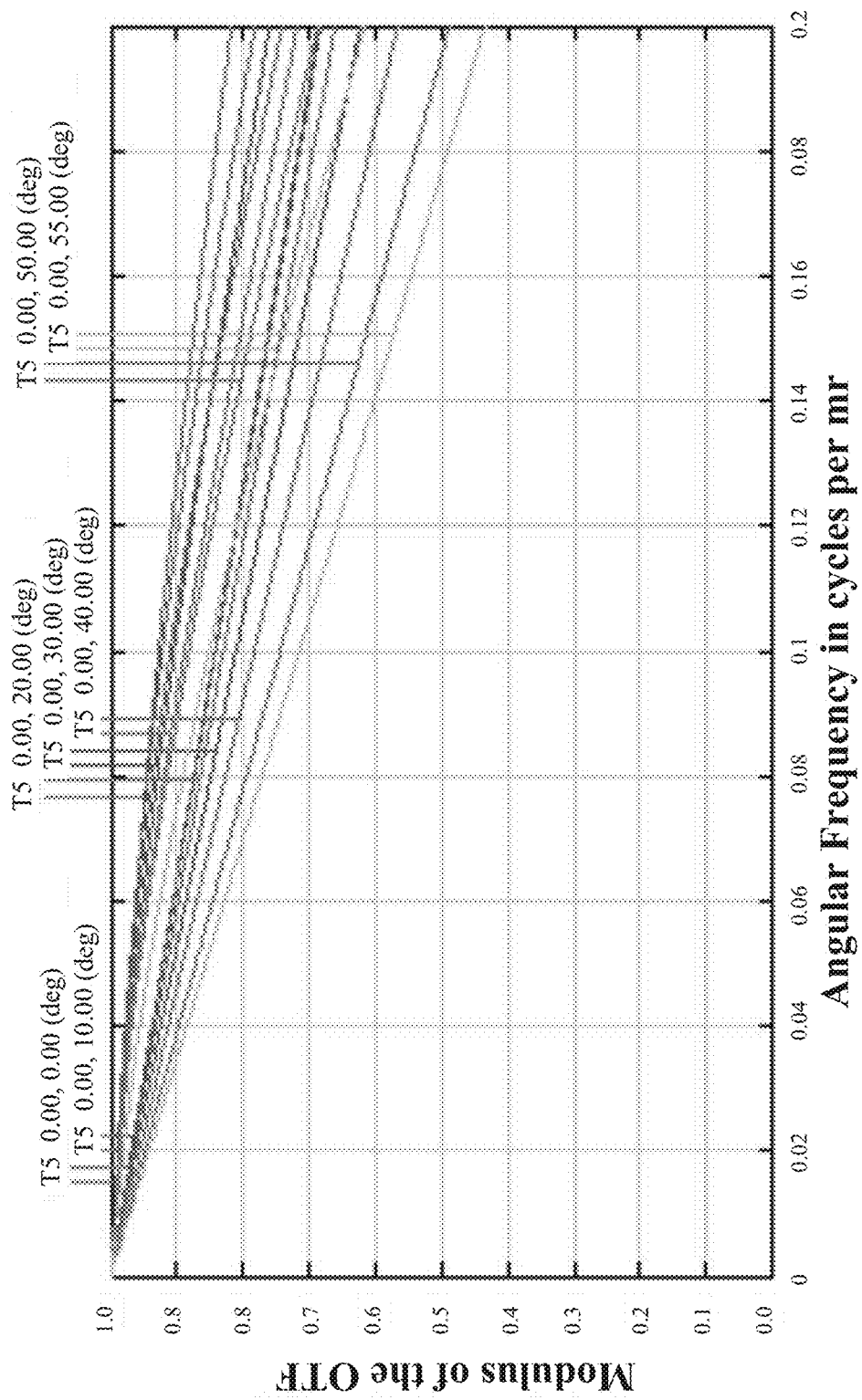
FIG. 4a is a plot the modulation transfer function (MTF) of an example modular compound lens.
Figure 4C:
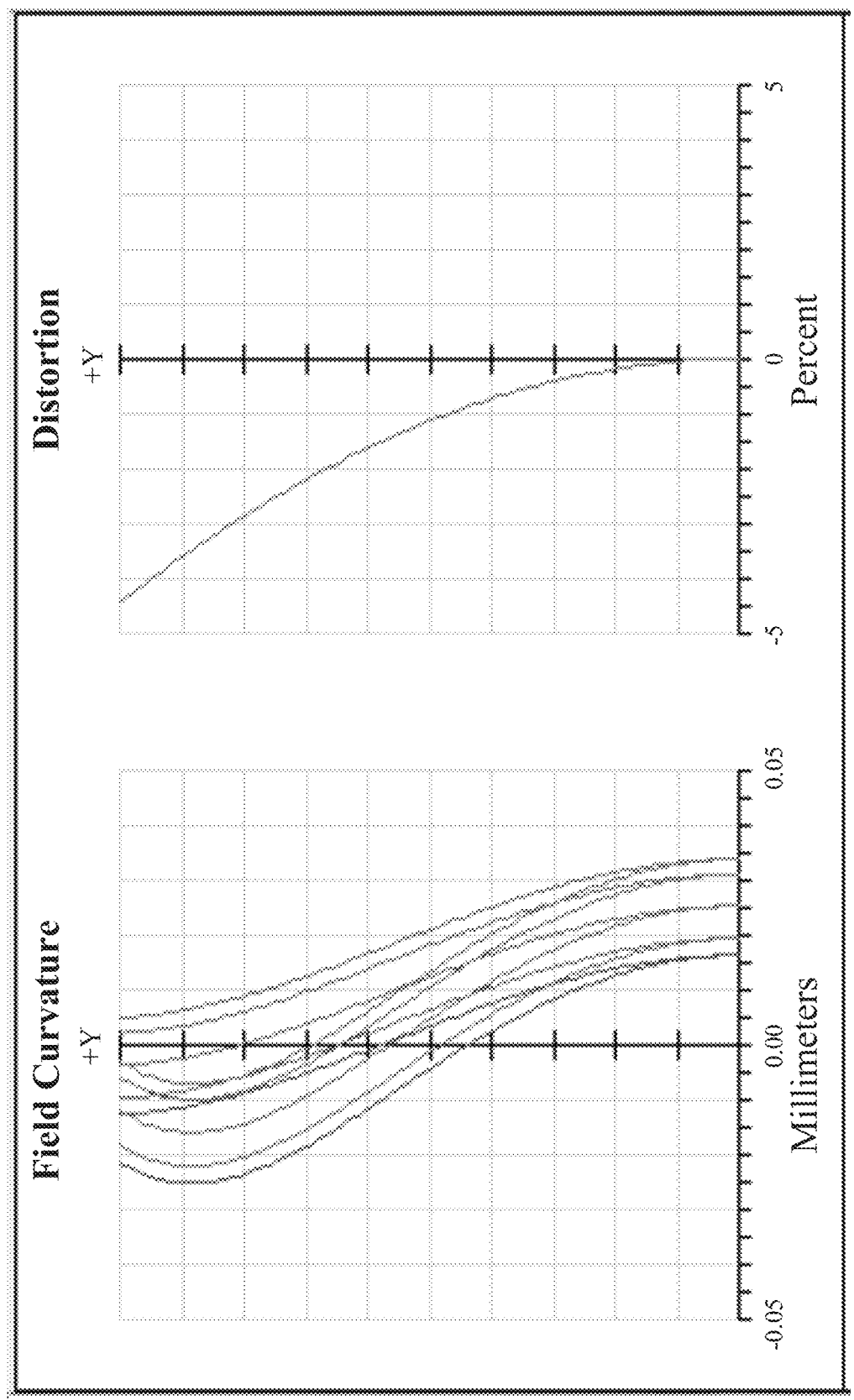
FIG. 4c are plots of the field curvature and distortion of an example modular compound lens.
Figure 4D:
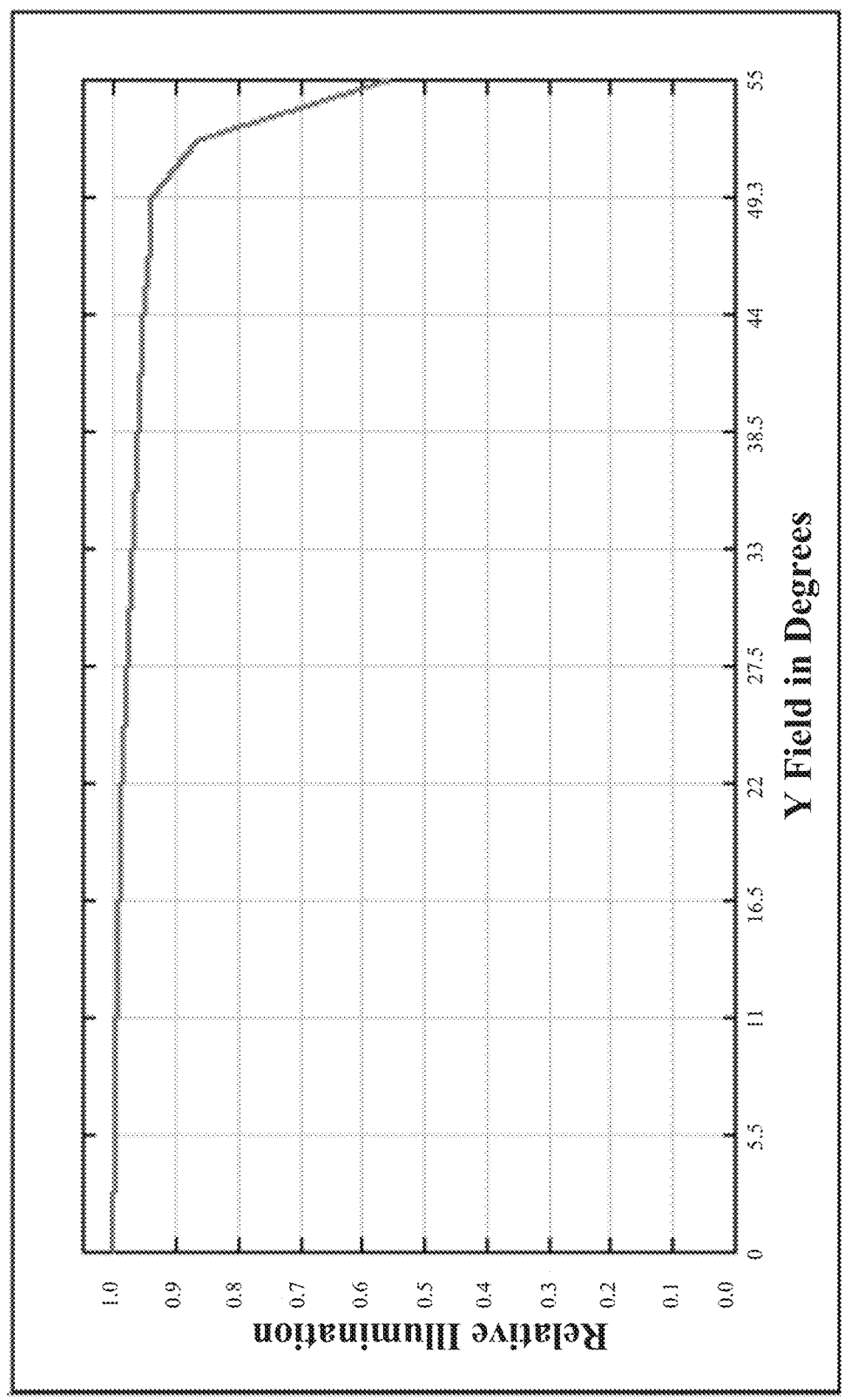
FIG. 4d is a plot of the relative illumination of an example modular compound lens.

Modular compound lens 300 projects an image of an object that lies in the FOV onto sensor 218. In one or more embodiments, compound lens 300 can yield an FOV of 100 degrees on one plane with an F-number of 1.8, and can exhibit a distortion of 5%, uniform relative illumination and a nearly diffraction limited MTF up to 0.2 cy/mr (cycles per milliradian), corresponding to a focal length of 2 mm to about 100 lp/mm (line pairs per millimeter). FIGS. 4a-4d are plots of simulated performance parameters of one or more embodiments of the modular compound lens 300 for the half field of view of ±55 degrees. FIG. 4a plots the MTF, FIG. 4b plots the spot diagram, FIG. 4c plots the field curvature and distortion, and FIG. 4d plots the relative illumination.

Figure 5:
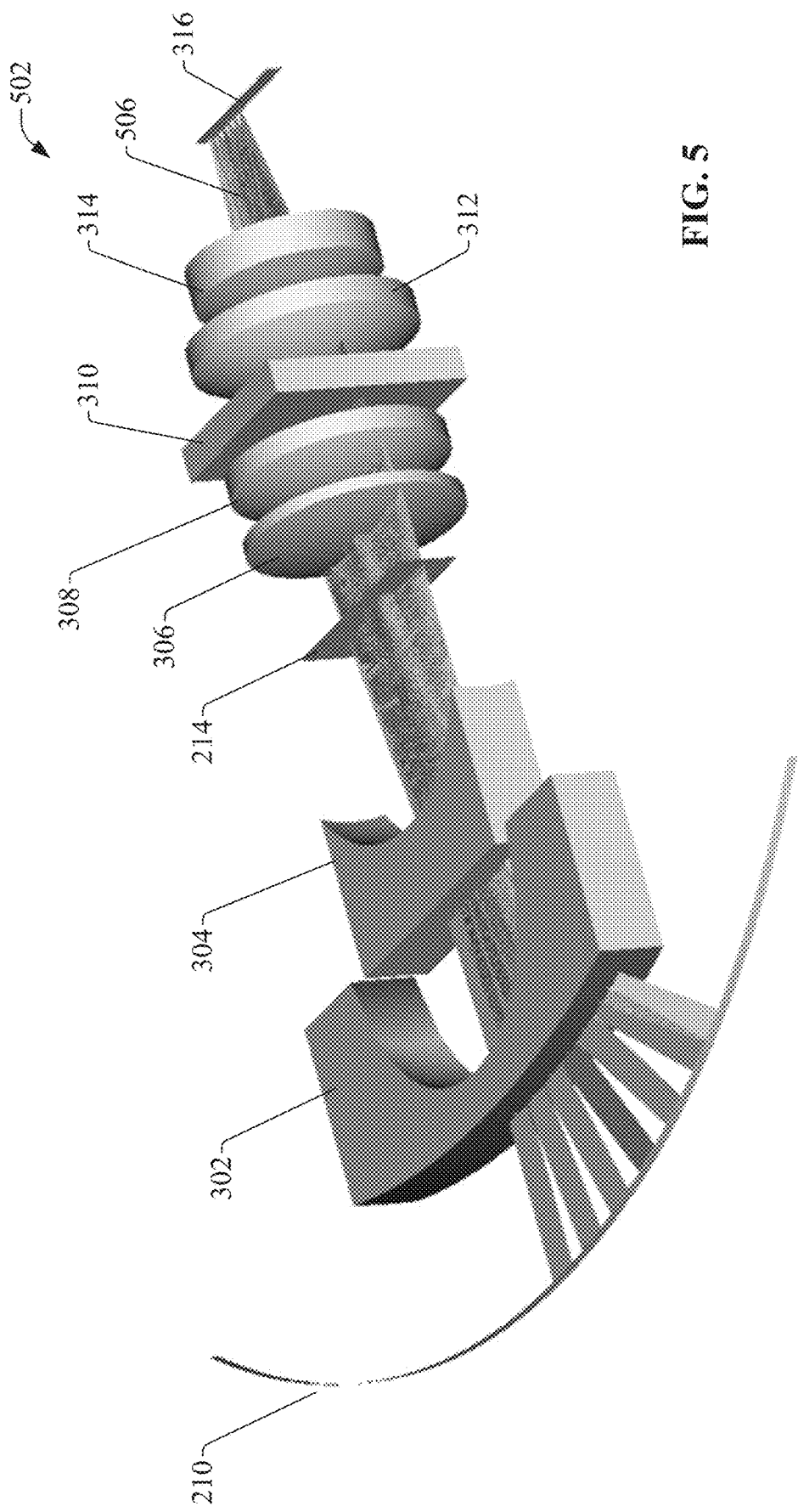
FIG. 5 is a diagram of an example modular compound lens having an FOV of 100×2 degrees.

FIG. 5 illustrates another example modular compound lens 502 having an FOV of 100×2 degrees (that is, an FOV of 100 degrees horizontal and 2 degrees vertical). Similar to lens 300, lens 502 comprises a primary lens 302, a secondary lens 304, a tertiary lens 306, a quaternary lens 308, a bandpass filter 310, a quinary lens 312, and a senary lens 314. In this embodiment, the vertical FOV is limited by two apertures—a field stop 210 set before the primary lens 302 and an aperture stop 214 set between secondary lens 304 and tertiary lens 306 near the designed lens stop. Because of the narrow vertical FOV, the primary and secondary lenses 302 and 304 are depicted in a truncated manner in FIG. 5. Modular compound lens 502 is capable of focusing a set of rays 506 from the field of view onto the sensor 316.

Figure 6:
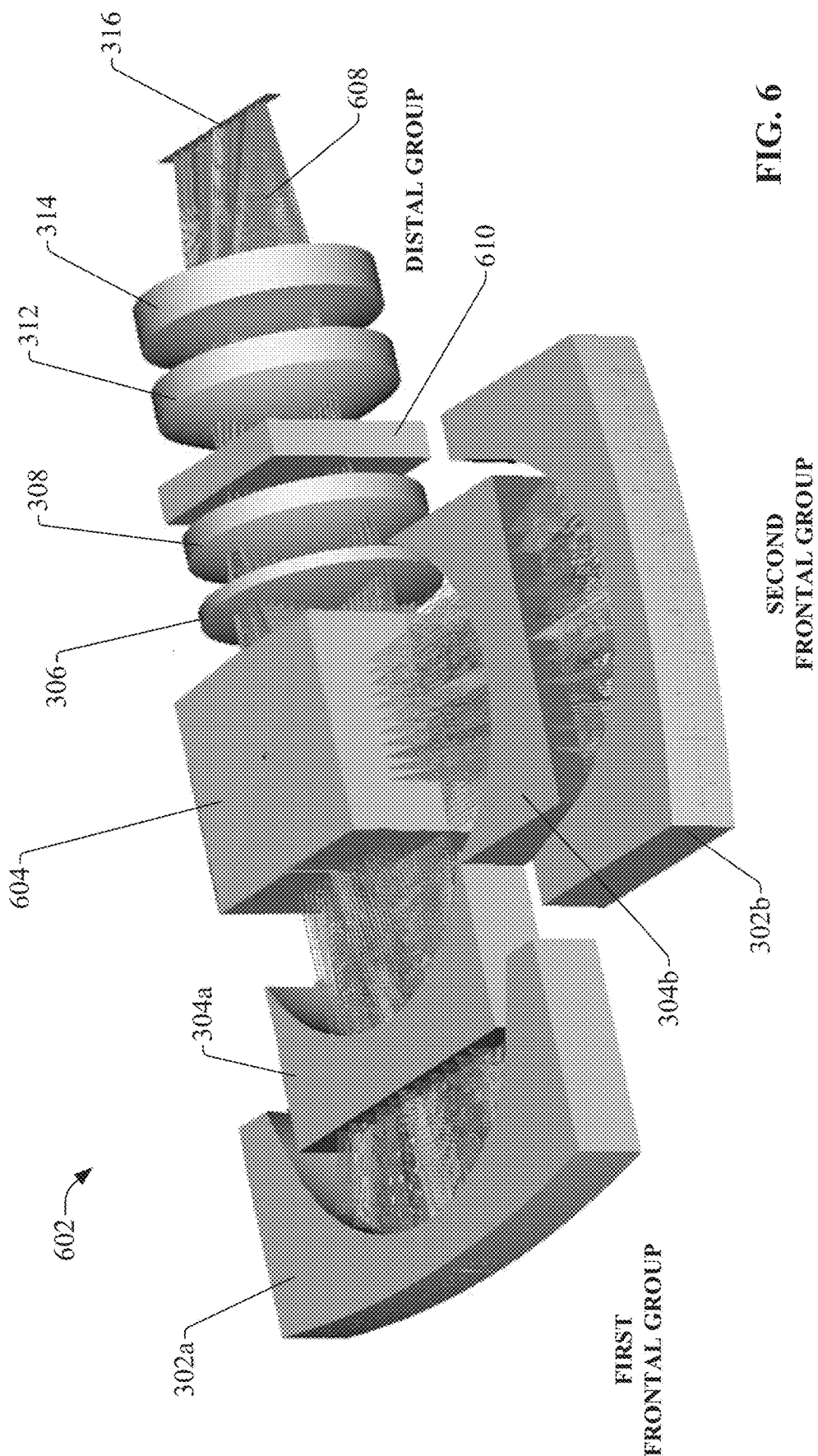
FIG. 6 is a diagram of an example modular compound lens having an FOV of 190×2 degrees.

The optical elements illustrated in FIG. 5 collectively make up an elementary unit of the compound lens 502. The elementary unit serves as a basic compound lens to which additional modular components can be added in order to increase the horizontal field of view. The horizontal FOV of modular compound lens 502 (the elementary unit) can be extended by adding additional sets of primary and secondary lenses 302 and 304 (that is, additional frontal groups of optical elements). For example, FIG. 6 illustrates an example modular compound lens 602 having an FOV of 190×2 degrees (190 degrees horizontal and 2 degrees vertical), with an F-number of 1.8 (F/1.8). In this example, tertiary lens 306, quaternary lens 308, filter 610 (e.g., a triple bandpass filter), quinary lens 312, and senary lens 314 form a distal group. Primary lens 302a and secondary lens 304a are oriented in line with the elements forming the distal group and form a first frontal group having a common optical axis with the distal group. A beam combiner 604 is set between the first frontal group and the distal group (that is, between secondary lens 304 and tertiary lens 306). Beam combiner 604 has no dioptric power in this example embodiment.

In addition, a second frontal group comprising primary lens 302b and secondary lens 304b is added such that the second frontal group is oriented on the same horizontal plane as the first frontal group at an angular separation of 90 degrees (or approximately 90 degrees) about the beam combiner 604 relative to the first frontal group (that is, the optical axes of the first frontal group and the second frontal group form approximately 90 degrees, with the two optical axes intersecting at the beam combiner 604). Primary lens 302a of the first frontal group refracts light rays to secondary lens 304a, which refracts the received light to the beam combiner 604. Similarly, primary lens 302b of the second frontal group refracts light rays to secondary lens 304b, which refracts this received light to the beam combiner 604.

Beam combiner 604 combines these two beams using any suitable beam combining technique and directs the combined beams along the optical axis of the distal group of elements. For example, in some embodiments beam combiner 604 may be a chromatic cube beamsplitter that combines the two beams using wavelength diversification. In such embodiments, the chromatic cube beamsplitter can be configured to transmit light within a first wavelength range of the first field of view of the first frontal group, and to reflect light within a second wavelength range of a second field of the second frontal group. Thus, when light rays from the two fields of view enter respective two adjacent sides of the beamsplitter cube (via the primary and secondary lenses 302 and 304), both rays are projected from a third side of the beamsplitter cube (the side facing the distal group) as a combined beam along the optical path of the elements of the distal group. The beamsplitter cube can be configured to combine either monochromatic rays or polychromatic rays, provided the signature colors of light coming from the two fields of view are disparate so that the combiner 604 can differentiate between the two fields of view. The bandpass filter 310 of modular compound lens 502 is replaced in this embodiment with a filter 610 that transmits both wavelength ranges received by the first and second frontal groups (e.g., a dual bandpass filter).

In another example embodiment, compound lens 602 can use polarization diversity of the two fields of view to facilitate combining the two beams from the two frontal groups. In such embodiments, beam combiner 604 can be a polarizing beamsplitter cube configured to combine the diversely polarized light from the two fields of view. For example, compound lens 602 can be configured to polarize light received from the first frontal group (lenses 302a and 304a) in a first direction before the light reaches combiner 604 (e.g., using a polarization filter placed within the optical path prior to the combiner 604, or using other polarizing means). Likewise, the compound lens 602 can be configured to polarize light received from the second frontal groups (lenses 302a and 302b) in a second, different direction before the light reaches the combiner 604, thereby diversifying the polarity of the light from the two fields of view. The combiner 604, embodied as a polarizing beamsplitter cube or another component configured to combine two or more light beams with different polarities, can be configured to reflect light of the first polarity and to transmit light of the second polarity. Consequently, by directing the beams from the two frontal groups onto two adjacent faces of the polarization beamsplitter cube, the beams are combined and directed from a third face of the beamsplitter cube along the optical path of the distal group elements (lenses 306, 308, 312, and 314 and bandpass filter 310).

For embodiments that use the beamsplitting techniques described above to combine optical rays from the two frontal groups, the compound lens 602 can separate the optical rays for the two fields of view using a second complimentary beamsplitter (not shown) disposed downstream from the senary lens 314. For example, for embodiments in which the two fields of view imaged by the first frontal group and the second frontal group are combined using a dichroic beamsplitter cube, a second dichroic beamsplitter having the same cut-off wavelength as the combiner 604 can be disposed within the compound lens 602 downstream from the senary lens 314. The second dichroic beam splitter can receive the combined beam and separate the color-differentiated light information for the two fields of view; e.g., by transmitting the optical rays for the first field of view based on its first color signature and reflecting the optical rays for the second field of view based on its second color signature. The image processing components associated with sensor 316 can then process the separated beams to yield image data for the two fields of view and combine the resulting image data into a composite, wide-angle image. Similarly, for embodiments in which the combiner 604 is a polarizing beamsplitter cube, the optical rays for the two fields of view can be separated using a second polarizing beamsplitter cube that receives the combined beam from the senary lens 314. The second polarizing beamsplitter cube can separate the light information from the combined beam based on the differentiated light polarities of the two fields of view.

In one or more embodiments, as an alternative to the beamsplitting techniques described above, combiner 604 may combine the beams from the first frontal group and the second frontal group by time-interleaving the acquisition of the beams from the two frontal groups. In such embodiments, the combiner 604 may comprise an electromechanical mechanism such as a steering mirror, an opto-electric valve, or other device capable of selectively passing one or the other of the light beams from the two fields of view to the other optical elements of the distal group. Using this approach, combiner 604 can combine the two fields of view by driving the electromechanical mechanism alternately between the two beams from the respective two frontal groups according to a timing sequence known by image processing components associated with the imaging system's sensor 316, thereby sending optical rays from the two fields of view down the same optical path (the optical axis of the distal group) in a time-interleaved fashion. Image processing components downstream from the senary lens 314 (e.g., a charge-coupled device (CCD), complimentary metal-oxide semiconductor (CMOS), etc.) can then read the time-interleaved optical rays for the two fields of view synchronously with the combiner 604 in order to separate the two sets of data contained in the combined beam.

In yet another embodiment, beam combiner 604 can be realized by a cube beamsplitter which transmits and reflects approximately half of each beam received from the respective frontal groups. Thus, about 50% of the collected rays from each field of view are transmitted to the sensor 316, while 50% are lost. In cases of abundant illumination, the loss will not adversely affect the resulting image.

Although a number of example implementations for beam combiner 604 have been described above (color beamsplitting, polarity beamsplitting, time-interleaving, etc.), it is to be appreciated that some embodiments of compound lens 602 can combine rays from multiple fields of view using other means, or by jointly using a combination of any two or more of the light combination techniques described above.

In order to acquire the composite image from the separated sets of field of view information, compound lens 602 can direct the separated beam information to one or more recording devices of an imaging system, such as a solid state sensor 316 as depicted in FIG. 6 (e.g., a photodiode array, CCD, or CMOS), photographic film or emulsion, etc. Various embodiments of compound lens 602 can use any suitable technique to generate a composite image from the two fields of view provided by the first and second frontal groups while preventing image information from dissimilar fields of view from overlapping. For example, once the beams for the two fields of view have been separated from the combined beam, light processing components within the compound lens 602 can aim the two beams toward different zones of the image plane of sensor 316 (e.g., a photodiode array, a CCD, CMOS, photographic film, etc.), such that the two fields of view are joined along the correct edges with minimal or no overlap between the two fields. This can be achieved, for example, by tilting the beam combiner 604 by a small angle—e.g. approximately 1 degree—relative to the main optical axis of the distal group. This causes the beam combiner 604 to reflect the sets of rays arriving from the respective two frontal groups at slightly separate angles, such that the two sets of rays form two images on distinct areas of sensor 316. Alternatively, the separated beams can be processed by different solid state sensors to yield image information for the two fields of view, and the image information can be joined by a software routine to yield the composite image.

Figure 7:
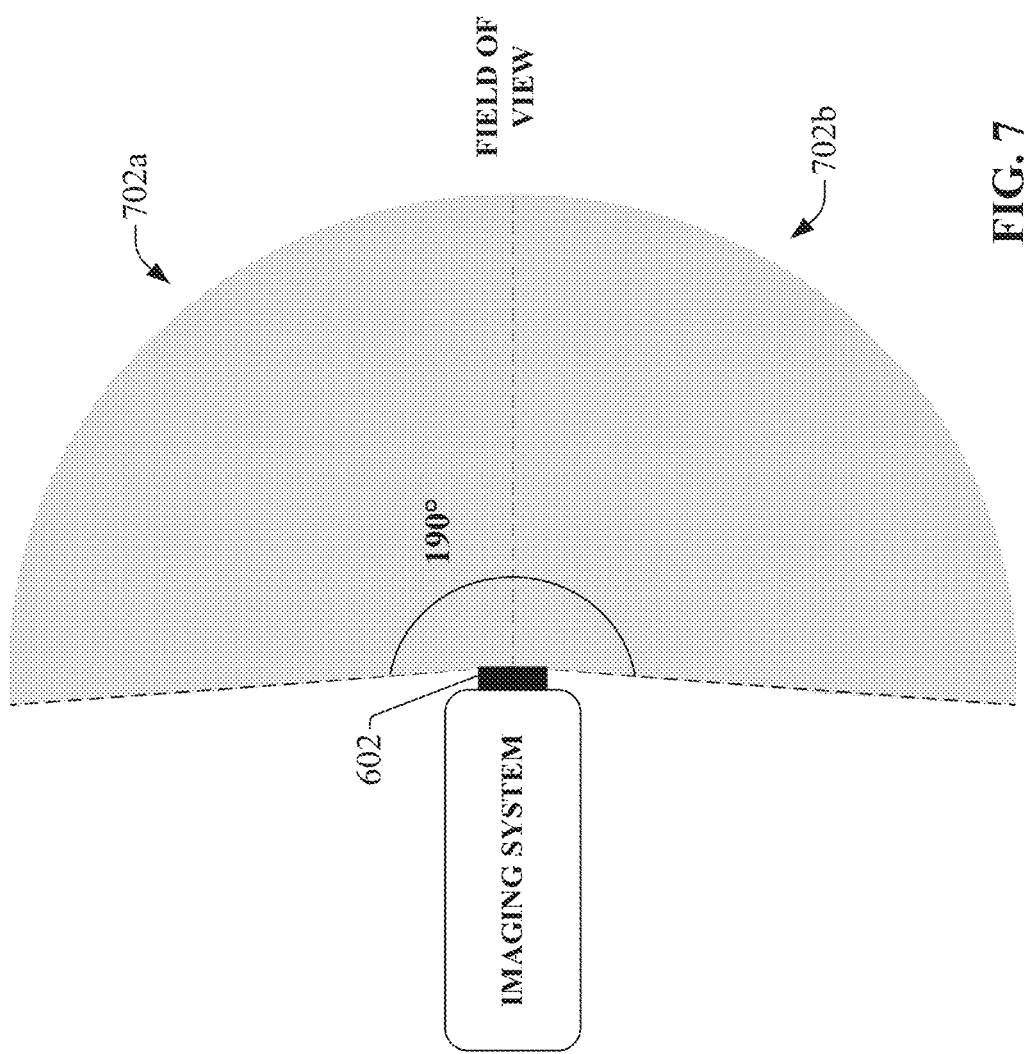
FIG. 7 is a diagram illustrating the composite field of view obtained by a modular compound lens by combining two fields of view received via two frontal groups of the compound lens.

Adding the second frontal group—comprising second primary lens 302b and second secondary lens 304b—and processing the field of view information obtained by the two frontal groups as described above can increase the horizontal field of view to approximately 190 degrees. FIG. 7 is a diagram illustrating the composite or aggregate field of view obtained by compound lens 602 by combining the two fields of view 702a and 702b received via the two frontal groups.

The addition of the second primary-secondary lens pair (the second frontal group), and the corresponding doubling of the field of view, does not change the F-number of modular compound lens 602 relative to lens 502, which remains 1.8 in some embodiments. Moreover, the addition of the second frontal group does not affect the observed aberrations, and thus the image distortion and the MTF remain unchanged relative to compound lens 300 when the second frontal group is added.

Figure 8:
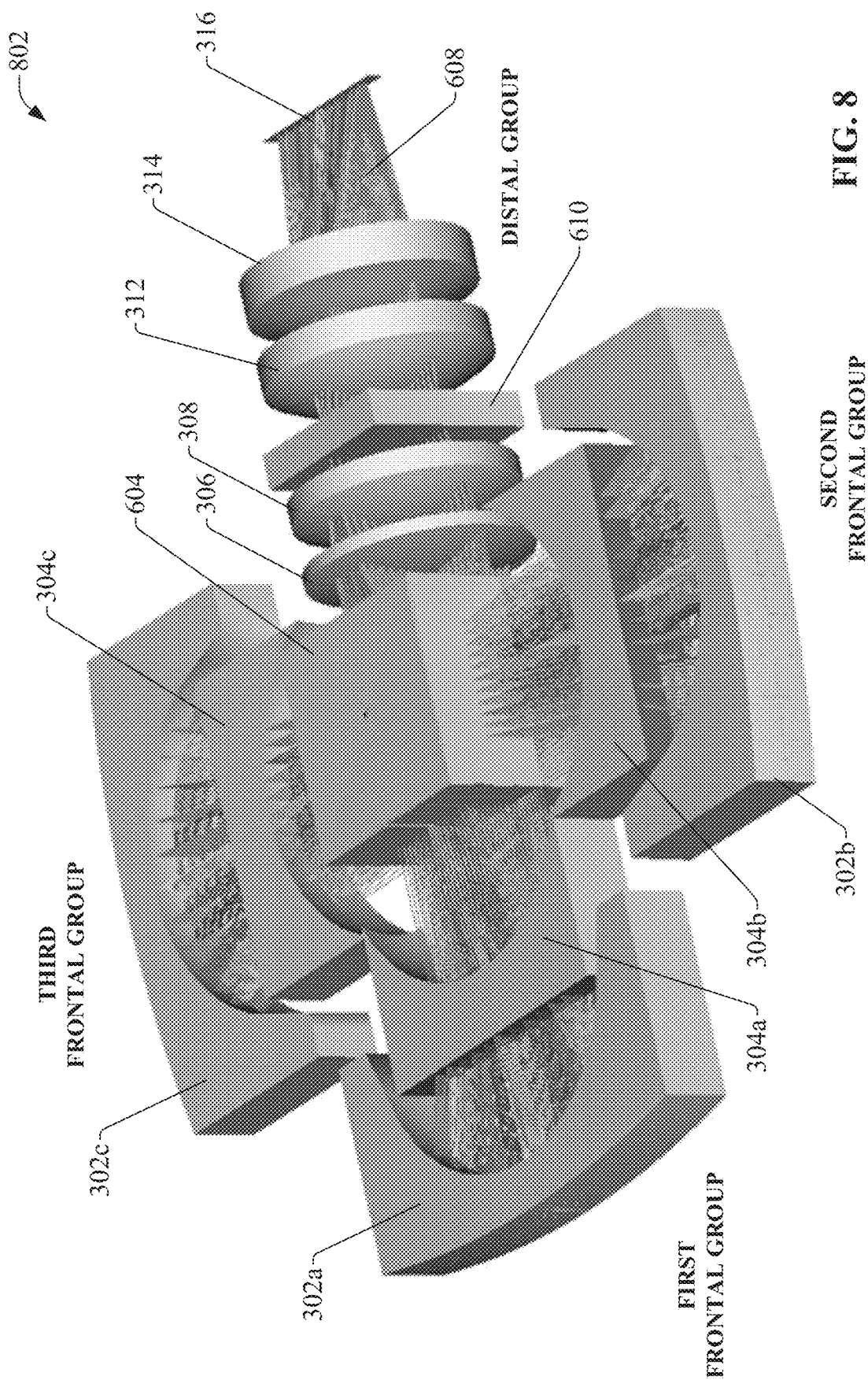
FIG. 8 is a diagram of an example modular compound lens having an FOV of 270×2 degrees.

The horizontal FOV of lens 602 can be further increased to approximately 270 degrees by adding a third frontal group comprising third primary lens 302c and third secondary lens 304c. FIG. 8 illustrates this example modular compound lens 802 having an FOV of 270×2 degrees (270 degrees horizontal and 2 degrees vertical), with an F-number of 1.8 (F/1.8). In this example embodiment, a third frontal group comprising primary lens 302c and secondary lens 304c is added to the modular lens 602 depicted in FIG. 6, such that the third frontal group is oriented on the horizontal plane at an angular separation of −90 degrees (or approximately −90 degrees) about the beam combiner 604 relative to the first frontal group. Primary lens 302a of the first frontal group refracts light rays to secondary lens 304a, which refracts the received light to the beam combiner 604. Similarly, primary lens 302b of the second frontal group refracts light rays to secondary lens 304b, which refracts this received light to the beam combiner 604, and primary lens 302c of the third frontal group focuses light to secondary lens 304c, which refracts this received light to the beam combiner 604.

Figure 9:
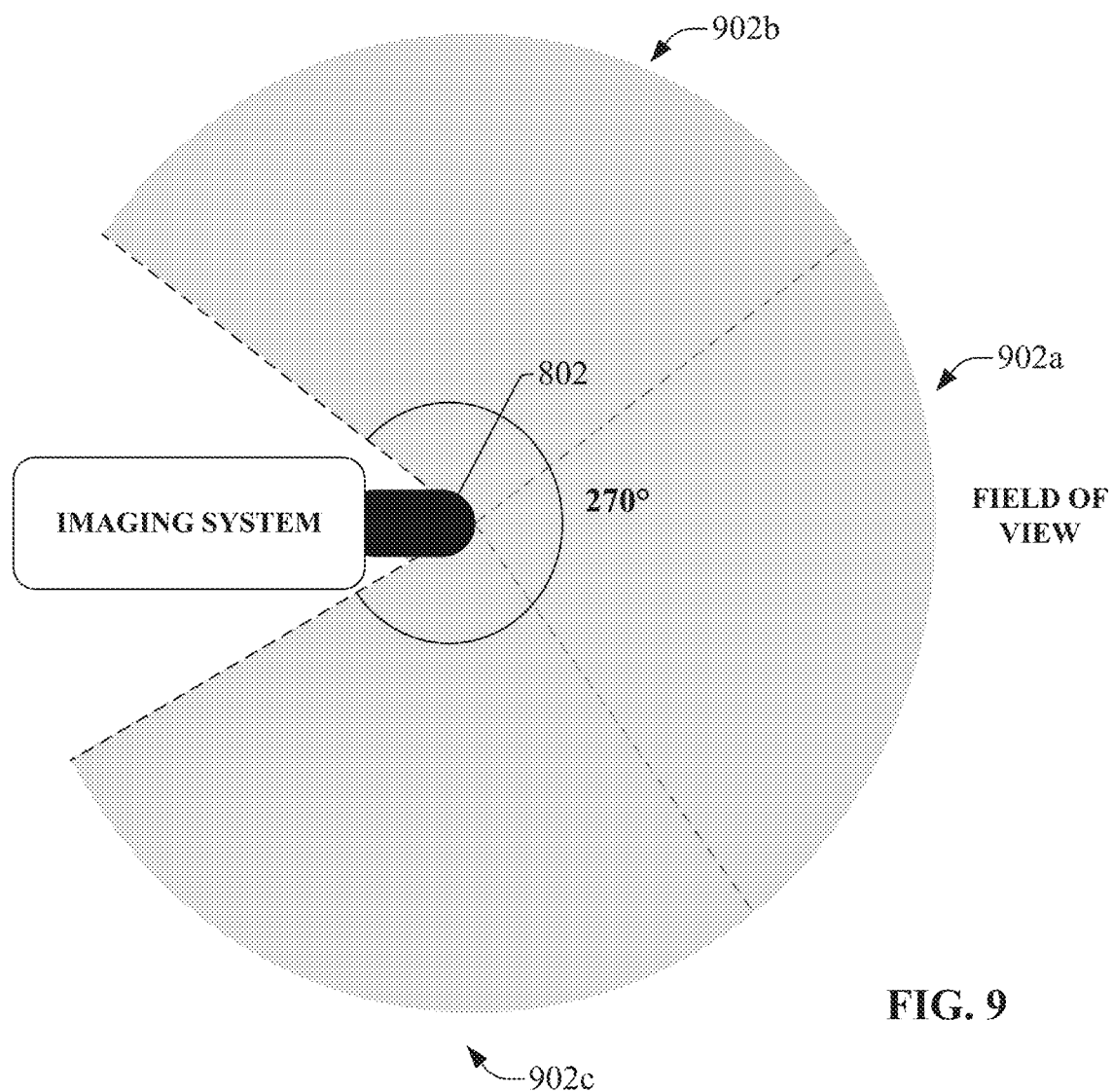
FIG. 9 is a diagram illustrating a composite field of view obtained by a modular compound lens by combining three fields of view received via three frontal groups of the compound lens.

Beam combiner 604 can combine the three beams from the respective three frontal groups using one or more of the beam combing techniques described above (e.g., color beamsplitting, time-interleaving, etc.) and direct the combined beams along the optical axis of the distal group of lenses. The composite image can be obtained from the three combined sets of FOV information using techniques similar to those described above for compound lens 602 illustrated in FIG. 6. For example, the combined beam can be separated using a complimentary beamsplitter (not shown) disposed between the senary lens 314 and sensor 316, and the three sets of separated beam information can be directed to sensor 316 (or another recording device), which aggregates the three FOVs represented by the three sets of beam information to yield a composite image. This can be achieved, for example, by directing the three separated beams to three separate zones of the image plane of sensor 316 such that the three fields of view are joined along the correct edges with little or no overlap between the fields, similar to the technique described above for lens 602. This yields an FOV of approximately 270×2 degrees. FIG. 9 is a diagram illustrating the composite or aggregate field of view obtained by compound lens 802 by aggregating the three fields of view 902a, 902b, and 902c received via the three frontal groups.

In various embodiments, any of modular compound lenses 502, 602, or 802 can include physical apertures, or stops, located before primary lenses 302 that distinctly define the FOV and, in the case of lenses 602 and 802, prevent cross talk between the multiple FOVs obtained by the multiple frontal lens groups. The positioning of such a stop (referred to as a field stop) well ahead of the lens' first surface (the surfaces of primary lenses 302) limits the FOV without affecting the F-number. For practical reasons, the field stop is not placed very far away from the lens itself in some embodiments, and consequently the ability of the field stop to reduce the FOV is limited to a finite angle (e.g., several degrees). If a reduction of the FOV to a small angle on the order of a degree or less is desired, then an additional stopping can be provided by an aperture stop, which limits the extent of the marginal ray and thus stops the lens down and increases the F-number.

FIG. 10 is a diagram of an example compound modular lens 1002 that includes a field stop 210 and an aperture stop 214 to yield a field of view of 100×1.2. Similar to lens 302, this example lens 1002 includes the frontal group elements (primary lens 302 and secondary lens 304) and the distal group elements (tertiary lens 306, quaternary lens 308, bandpass filter 310, quinary lens 312, and senary lens 314), and sensor 316. Lens 1002 also includes a field aperture 210 located before the primary lens 302, and a stop aperture 214 located between the frontal group and the distal group (that is, between the secondary lens 304 and tertiary lens 306). The lens elements focus a set of rays 1008 from the field of view onto sensor 316. Also, this arrangement allows the FOV to be modified by stopping down the field stop and the aperture stop. For example, to achieve an FOV having a large angle—e.g., 100 degrees—in a first plane (e.g., the tangential plane) and a slender angle—e.g., 5 degrees—in the plane orthogonal to the first plane (e.g., the sagittal plane), both the field aperture 210 and the stop aperture 214 can be stopped down.

Figure 11A:
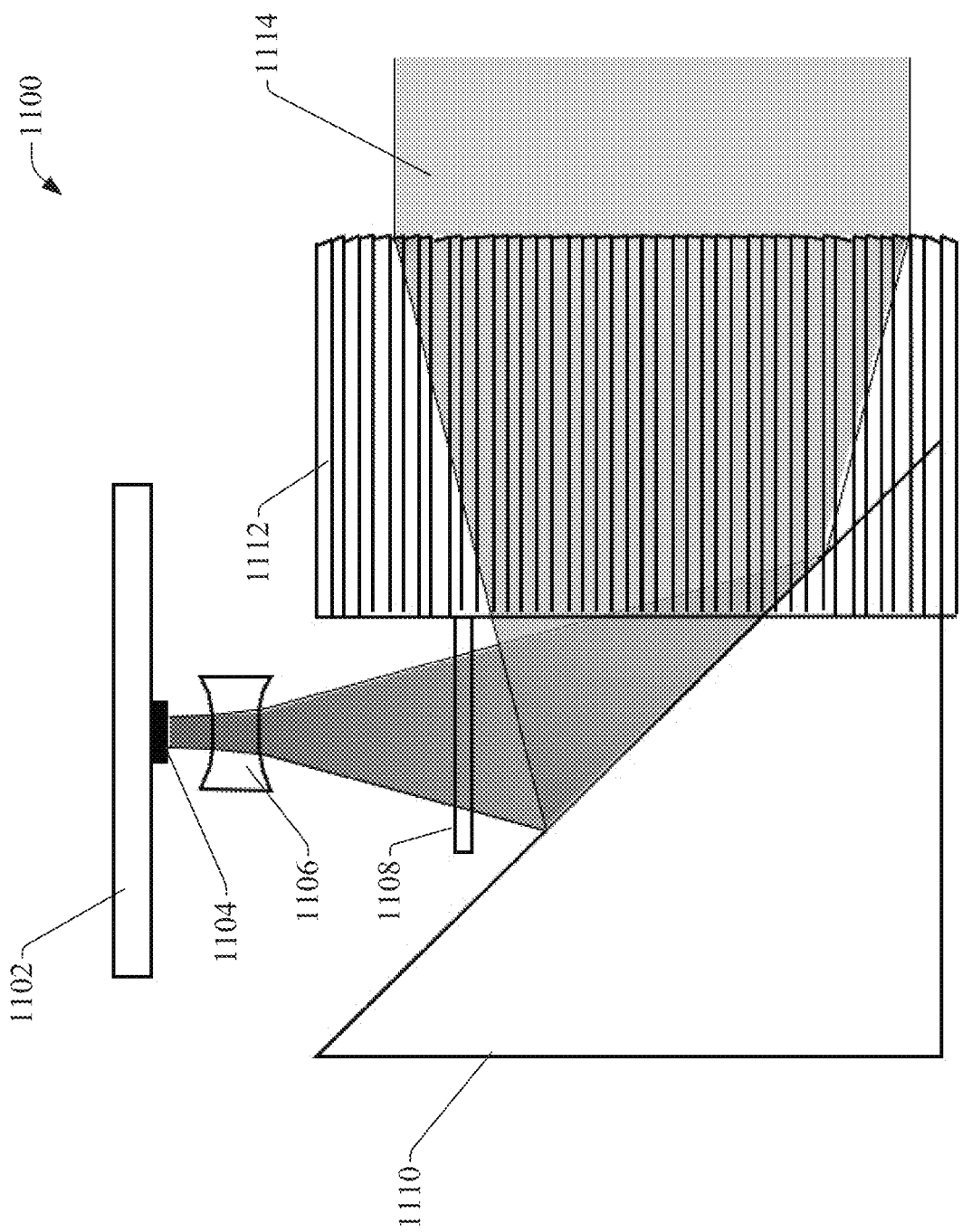
FIGS. 11a and 11b are a side view and a top view, respectively, of an example illuminator that can serve as an illumination source for a modular compound lens.
Figure 11B:
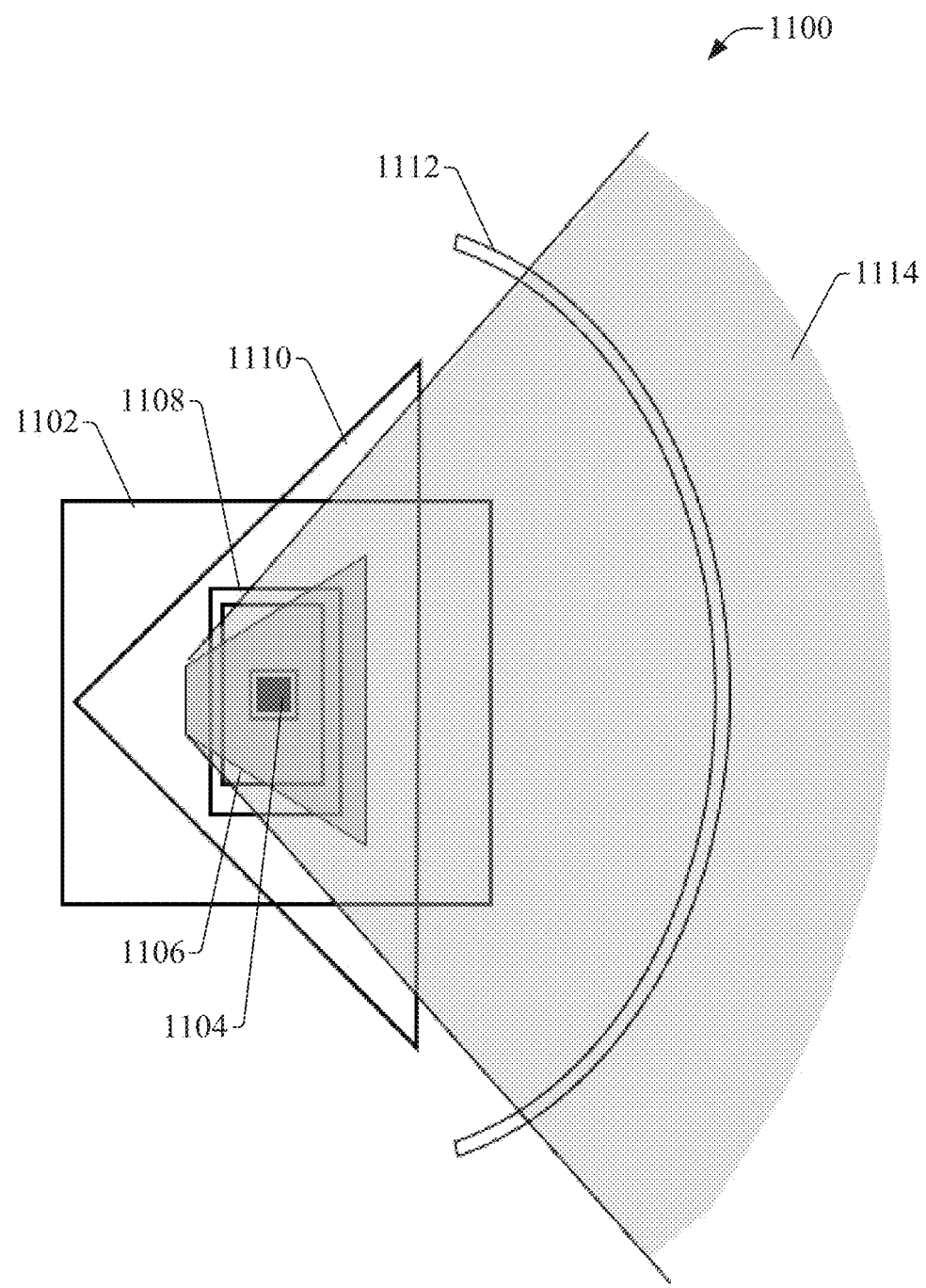

Any of the embodiments of compound modular lens described above (e.g., lenses 302, 502, 602, 802, or 1002) can be used in conjunction with a complementary illuminator having a wide horizontal field of illumination and a narrow vertical field of illumination. Example illumination systems can comprise an array of light sources, one or more lenses arranged to collect light from the array of light sources, a diffuser to scatter and homogenize the light within a well-defined solid angle, a folding mirror to fold the light at a desired angle, and an output lens directing the light to the field of illumination (FOI). FIGS. 11a and 11b are a side view and a top view, respectively, of an example illuminator 1100 comprising these components that can serve as an illumination source for the modular compound lenses described above. Illuminator 1100 comprises a printed circuit board (PCB) 1102 on which is mounted a light source 1104 (or an array of light sources) and its driver. In one or more embodiments, light source 1104 may comprise vertical-cavity surface-emitting lasers (VCSELs) formed in a line. Light source 1104 projects light downward, or substantially parallel to an axis of the cylindrical lens 1112. Illuminator 1100 also comprises a negative cylindrical lens 1106 (or multiple negative cylindrical lenses, or an array of other types of biconic lenses) that collects light from the light source 1104 and expands the light in at least one plane. In the example depicted in FIGS. 11a and 11b, negative cylindrical lens 1106 expands the optical beam only in the sagittal plane.

Illuminator 1100 further comprises a diffuser 1108 of 90×1 degrees that receives, scatters, and homogenizes the expanded light from the negative cylindrical lens 1106. Diffuser 1108 may be, for example, a microlens (or lenslet) array set in two layers in tandem to homogenize the optical beam from the negative cylindrical lens 1106. In some embodiments, this lenslet array can be made up of positive cylindrical lenslets that redistribute the beam in the tangential plane. In various embodiments, diffuser 1108 may be refractive or diffractive, scattering and homogenizing the beam in the tangential plane. Diffractive diffusers that may be used as diffuser 1108 can include those that rely on spatial amplitude modulation and others that are constructed on spatial phase modulation. The latter category can include diffusers having surface and bulk gratings. The surface grating of diffusers having bulk gratings can be realized by a surface holographic grating in some embodiments. In other embodiments the surface grating can be realized by a volume holographic grating.

Illuminator 1100 further comprises a planar folding mirror 1110 that receives and redirects the diffused light beam at 90 degrees. Folding mirror 1110 reflects the diffused beam from diffuser 1108 about an axis in the tangential plane. Collectively, the PCB 1102, light source 1104, negative cylindrical lens 1106, diffuser 1108, and folding mirror 1110 can be referred to as a light source assembly. As will be described below, the light source assembly can be modularly expanded in order to extend the FOI of the illuminator.

Illuminator 1100 further comprises a collimating cylindrical lens 1112 that receives and collimates the light reflected from folding mirror 1110 in one plane to yield a substantially collimated illumination beam 1114 directed to the FOI. Collimating cylindrical lens 1112 collimates the beam received from folding mirror 1110 in one plane (the sagittal plane), while allowing the beam to propagate in the orthogonal plane with minimal or no refraction of the rays, resulting in a substantially flat, disk-like field of illumination (or a disk sector shape in the case of systems that produce FOIs with horizontal angles of equal to or less than 360 degrees). In some embodiments, the collimating cylinder lens 1112 can be an arched Fresnel lens.

Illuminator 1100 can supply a relatively high optical power to a field of illumination that snugly subtends the FOV of the corresponding modular compound lens. Moreover, the illumination beam 1114 is homogenized by illuminator 1100, resulting in a nearly uniform irradiance across the FOI. This homogenized illumination can ensure that an equalized response is obtained from objects disposed anywhere in the FOV.

Figure 12:
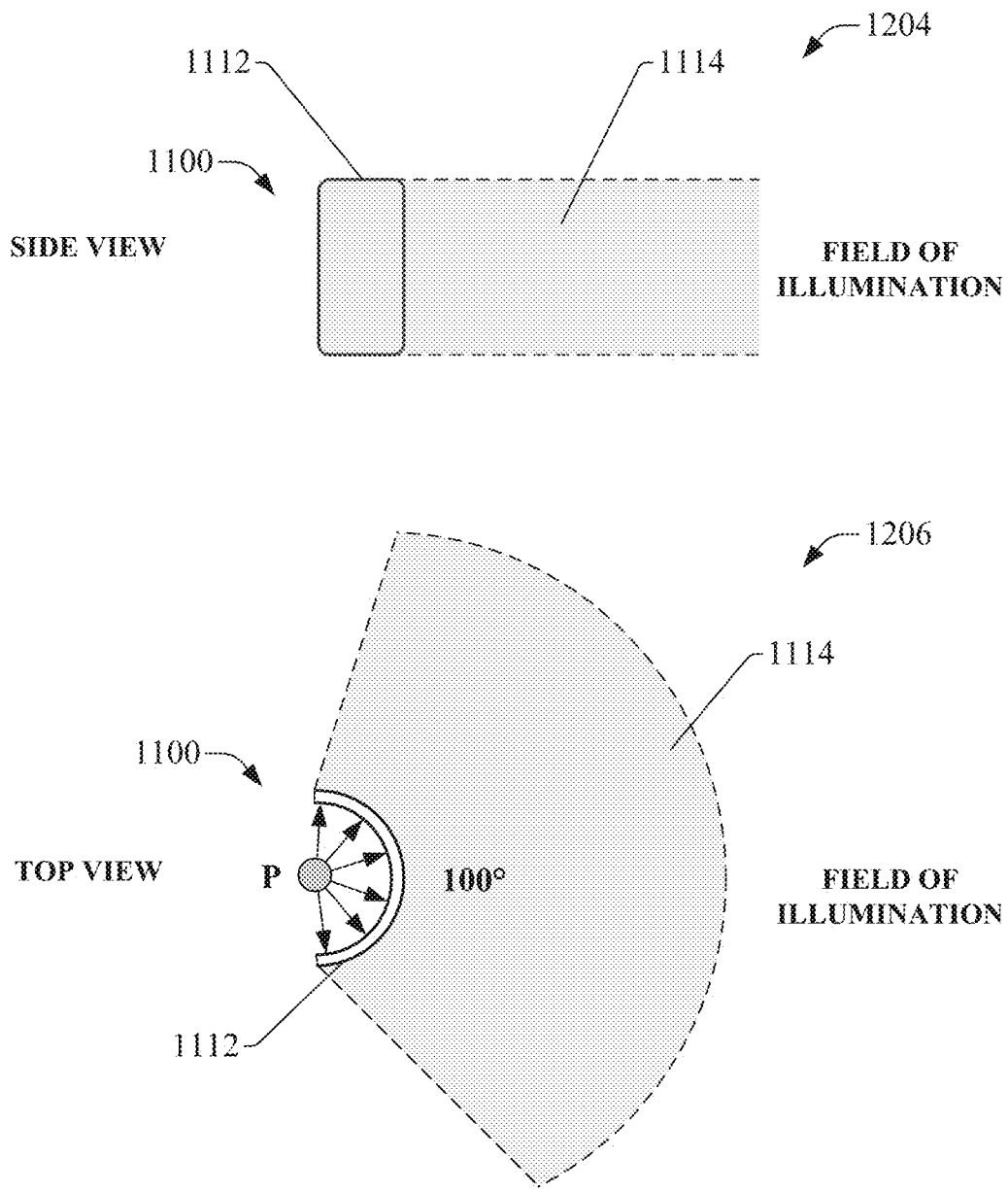
FIG. 12 is a side view and a top view of an illumination system illustrating the beam footprint for an illumination beam projected by the illumination system.

Propagating through the above optical train, the illumination beam 1114 expands in the tangential plane while being substantially collimated in the sagittal plane. FIG. 12 is a side view 1204 and a top view 1206 of illuminator 1100 projecting illumination beam 1114, illustrating the beam footprint for illumination beam 1114. In this example, illuminator 1100 is configured to yield a tangential expansion of approximately 100 degrees and a sagittal expansion of approximately 1 degree, thereby producing a very slender FOI. As shown in the side view 1204, the FOI has a substantially rectangular side profile due to collimation of the light in the sagittal plane. Owing to diffraction, the rectangle vertices of the FOI will become gradually rounded at a long range from the collimating cylindrical lens 1112 (e.g., twice the output aperture), such that the tangential expansion becomes substantially radial. For this reason, the homogenization of the beam 1114 (i.e. the distribution of its irradiance in the tangential plane) takes place along a circular arc.

As shown in the top view 1206, the FOI's horizontal angle of projection (100 degrees in the illustrated example embodiment) may be a function of the angle swept by the curved profile of the lens 1112, or may be less than the angle of the curved lens profile if the light source emits a more focused beam having a horizontal angle that is less than the angle of the lens's curved profile. As illustrated in FIG. 12, lens 1112 has no power in the presented tangential plane, refracting optical rays only in the sagittal dimension (perpendicular to the page), therefore the disk-like expansion of the beam in the tangential plane is caused by optics disposed inside the cavity of the lens. Lens 1112 produces an FOI having a shape that generally conforms to a disk sector, having a substantially flat vertical cross-section and a substantially circular vertical cross-section. Although the FOI illustrated in FIG. 12 has a shape conforming to a disk sector, embodiments of illuminator 1100 having a 360 degree profile can produce a fully disk-shaped FOI when a point source (P) having a 360 degree angle of illumination is used.

As a result of the arched topology of the lens 1112, light rays emitted from the point source P (or nearly a point source) that expand in space travel a substantially equal distance to the interior surface of the lens 1112 in some embodiments. Thus, if the point source is disposed at or near the focus of the curved profile of the lens 1112, the lens 1112 collimates the rays of the expanding optical beam in the designated plane. In the case of a finite source, the collimation is limited by beam étendue, consistent with the radiance theorem. On the other hand, disposing the point source at a normal angle to the incident rays in the plane where the lens has no dioptric power ensures minimal reflection and high transmission, yielding a high transmission efficiency.

Figure 13A:
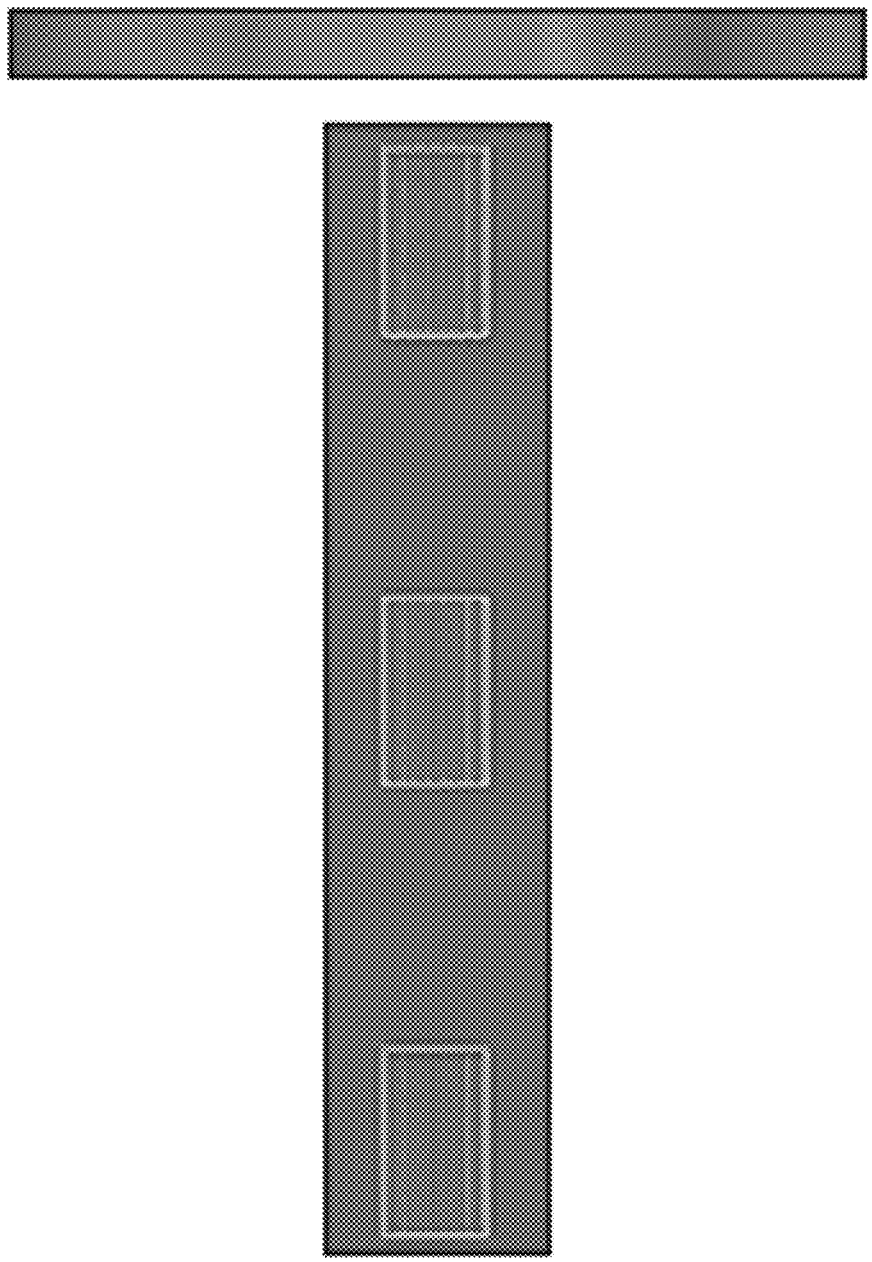
FIG. 13a is a graph of the irradiance of an illumination beam just past the illumination sources.
Figure 13C:
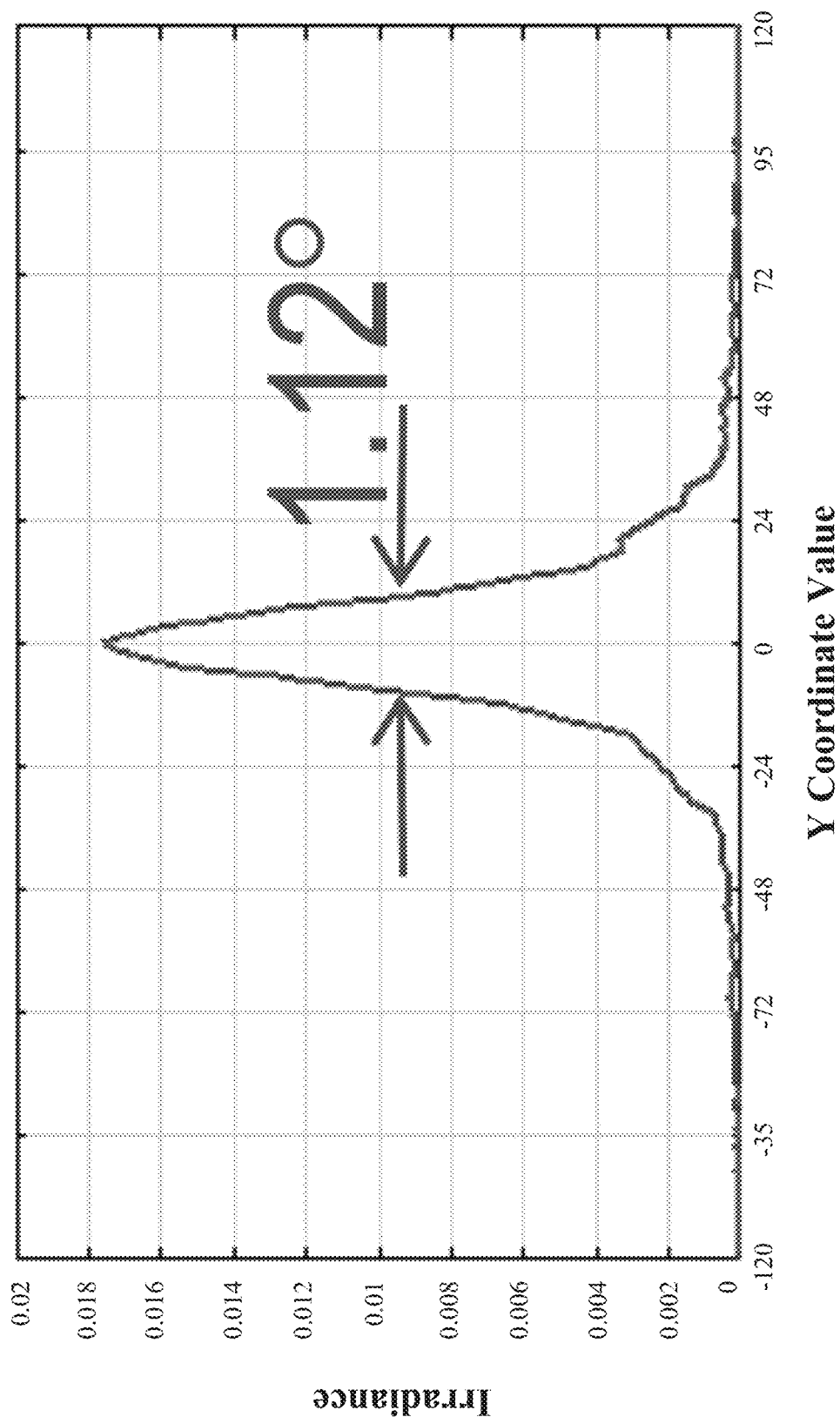
FIG. 13c is a graph of the radiance of illumination beam as a function of the elevation angle.
Figure 13D:
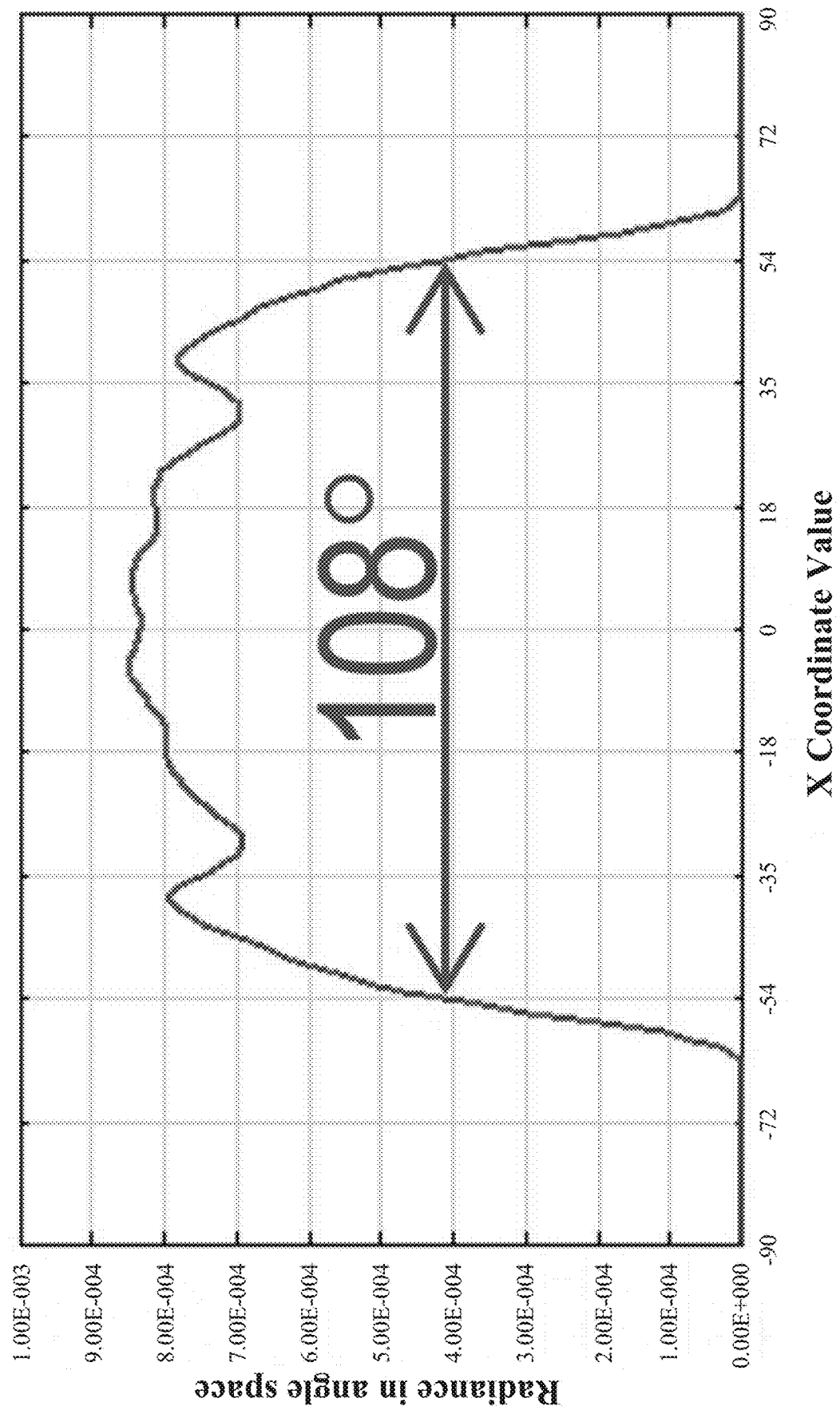
FIG. 13d is a graph of the radiance of illumination beam as a function of the azimuthal angle.

FIG. 13a is a graph of the irradiance of the illumination beam 1114 just past the illumination sources (e.g., 1 meter from the illuminator 1100), exhibiting 85% collection efficiency and also 85% homogeneity. FIG. 13b is a graph of the radiance of the illumination beam 1114 in the angular field. FIG. 13c is a graph of the radiance of illumination beam 1114 as a function of the elevation angle. FIG. 13d is a graph of the radiance of illumination beam 1114 as a function of the azimuthal angle.

In some embodiments, the expansion of light by diffuser 1108 may not axisymmetrical. Rather, in such embodiments diffuser 1108 can expand the beam at one angle in the tangential plane and at a different angle in the sagittal plane. Moreover, in some embodiments, the arched cylindrical lens 1112 can be set perpendicularly to the illumination beam, collimating the beam in the sagittal plane.

Figure 14:
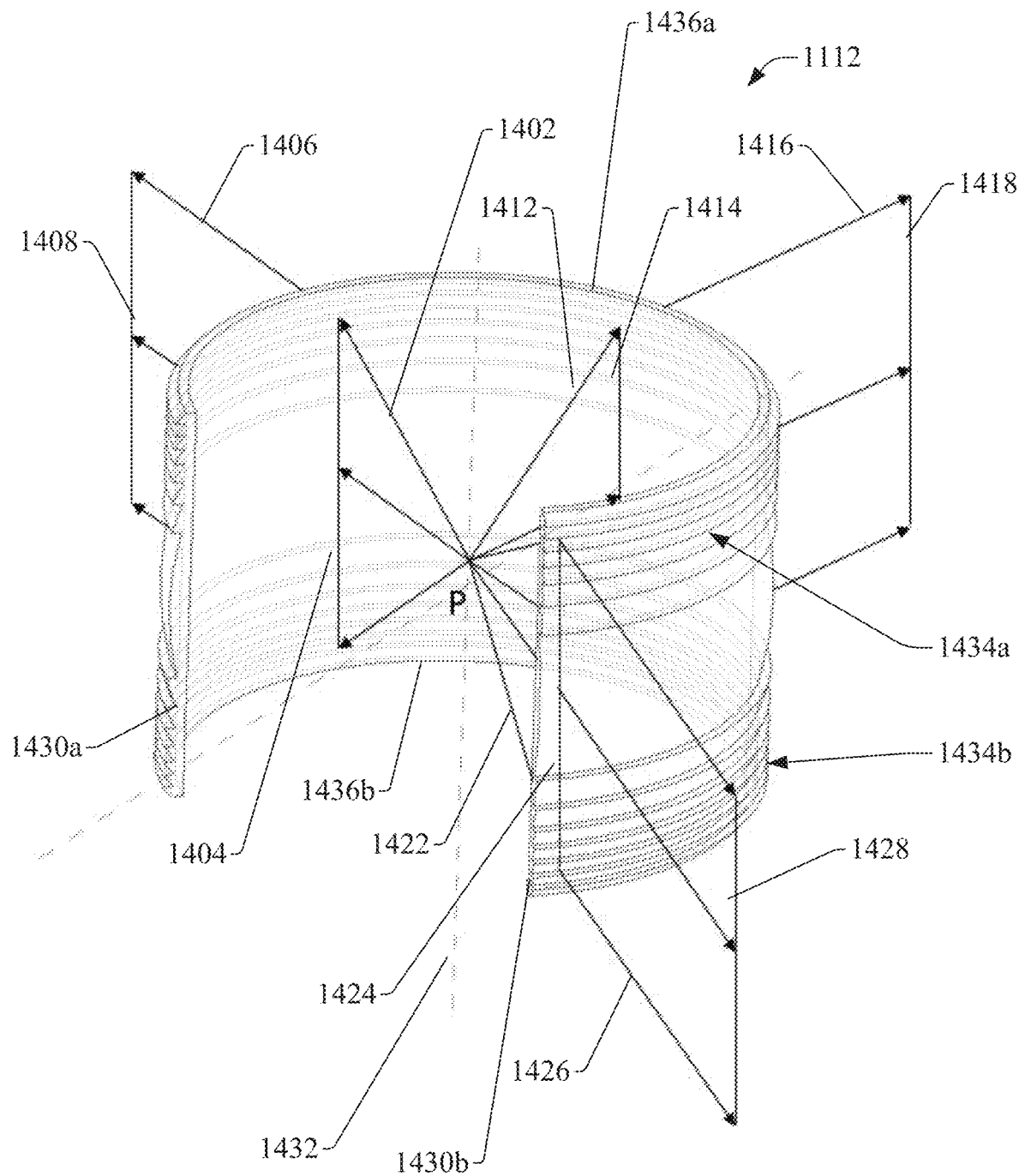
FIG. 14 is a diagram of an example bend collimating cylindrical Fresnel lens.

For embodiments in which the tangential is large—e.g., in excess of 30 degrees—collimating cylindrical lens 1112 can be bent so as to be located at the focal length of the optical beam for every angle. In this way, cylindrical lens 1112 collimates the beam 1114 equally well over the entire tangential FOI. In some embodiments, the bent collimating cylindrical lens 1112 can be a bent Fresnel lens. FIG. 14 illustrates an example bend collimating cylindrical Fresnel lens 1112 that can be used in some embodiments of illuminator 1100. The example cylindrical lens 1112 depicted in FIG. 14 has a cardinal surface, i.e. a virtual cylindrical surface in lieu of the customary cardinal plane, located at an equal distance from the virtual focus P of the expanding beam (e.g., from folding mirror 1110).

The example cylindrical lens 1112 depicted in FIG. 14—comprising an arched Fresnel lens—receives rays emanating from a point source P. Within the context of illuminator 1100, these rays may correspond to the rays reflected by folding mirror 1110. The arrows from point source P to the interior surface of lens 1112 represent a number of rays, which are a subset of all the rays emitted from the point source P. A first bundle of rays 1402 emanating from the point source P expand in the sagittal plane formed by the locus of rays incident on vertical line 1404 on the interior lens surface. Rays 1402 are refracted by the arched lens 1112 and propagate as a collimated beam ensemble 1406 in the sagittal plane formed with the wavefront 1408, thus flattening the beam. A second bundle of rays 1412 emanating from the point source P expand in a second sagittal plane formed with the locus of the rays incident on vertical line 1414 on the interior lens surface. Rays 1412 are refracted by the arched lens 1112 and propagate as a collimated beam ensemble 1416 in the sagittal plane formed with the wavefront 1418 of the rays. A third bundle of rays 1422 emanating from the point source P expand in a third sagittal plane formed with the locus of the rays incident on vertical line 1424 on the interior lens surface. Rays 1422 are refracted by the arched lens 1112 and propagate as a collimated beam ensemble 1426 in the sagittal plane formed with the wavefront 1428 of the rays. Although only three bundles of rays are illustrated in FIG. 14 for clarity, similar refraction and collimation is performed by lens 1112 for the rays of all sagittal planes incident on the interior surface of lens 1112. Together, the resulting collimated rays (e.g., collimated beam ensembles 1406, 1416, 1426, and all other beam ensembles collimated by lens 300) yield an optical beam that forms a substantially rectangular field of illumination (FOI) whose vertical angular footprint is slender. Owing to diffraction this rectangle vertices will become gradually rounded at a long range from the lens 1112, as may be expressed by the Huygens integral.

In some embodiments, the focal length of lens 1112 can be longer than the radius of the cylindrical arch of the lens 1112. In such embodiments, the refracted beam is expanded in the sagittal dimension, though at a smaller angle than the beam incident on the lens 1112. In other embodiments, the focal length of the lens 1112 can be shorter than the radius of the cylindrical arch of the lens 1112. In such embodiments, the refracted beam is focused in the sagittal dimension, forming a focal ring at a range around the arched lens 1112.

In some embodiments, lens 1112 can comprise a thin lens body that is arched about an imaginary vertical axis, or center-line axis 1432. In the example embodiment illustrated in FIG. 14, the arch of the lens 1112 about axis 1432 is substantially circular (specifically, an open circle having end points that do not meet), yielding a hollow cylindrical shape. However, some embodiments of lens 1112 may comprise arch profiles of other shapes—including but not limited to elliptical, parabolic, hyperbolic, or a free shape—without departing from the scope of this disclosure. Also, the example lens 1112 depicted in FIG. 14 subtends an angle of approximately 270 degrees about the center-line axis 1432 (that is, imaginary lines drawn from the vertical edges 1430a and 1430b of the lens 1112 to the axis 1432 of the cylinder form an angle of approximately 270 degrees with its vertex lying on the axis 1432). However, some embodiments of lens 1112 can subtend other angles, or may comprise a continuous, fully circular cylinder in which there are no vertical edges 1430a or 1430b.

Lens 1112 can be made of any suitable material, including but not limited to optical polymer or glass. In the example illustrated in FIG. 14, lens 1112 comprises an open cylinder in which vertical edges 1430a and 1430b of the cylinder (the edges substantially parallel with the axis 1432 of the cylinder) do not meet, resulting in a "C" shaped profile about the center-line axis 1432. It is to be appreciated, however, that some embodiments of the arched cylindrical lens may comprise fully circular profiles (or profiles of other closed curved shapes) with no vertical edges 1430a and 1430b.

In the example illustrated in FIG. 14, two refractive areas 1434a and 1434b traverse the upper and lower portions, respectively, of the outward-facing surface of the arched lens 1112. Refractive areas 1434a and 1434b comprise a number of adjacent, parallel angled grooves that traverse the outward-facing surface of the lens 1112 from the first vertical edge 1430a to the second vertical edge 1430b (though it is not necessary for the grooves to traverse the full distance between the vertical edges 1430a and 1430b). The grooves of refractive areas 1434a and 1434b run substantially parallel to the upper and lower edges 1436a and 1436b of the lens 1112, following the lens' curve profile. It is to be understood, however, that it is the full length of the lens that constitutes the dioptrical power of the lens in the sagittal dimension.

Figure 15:
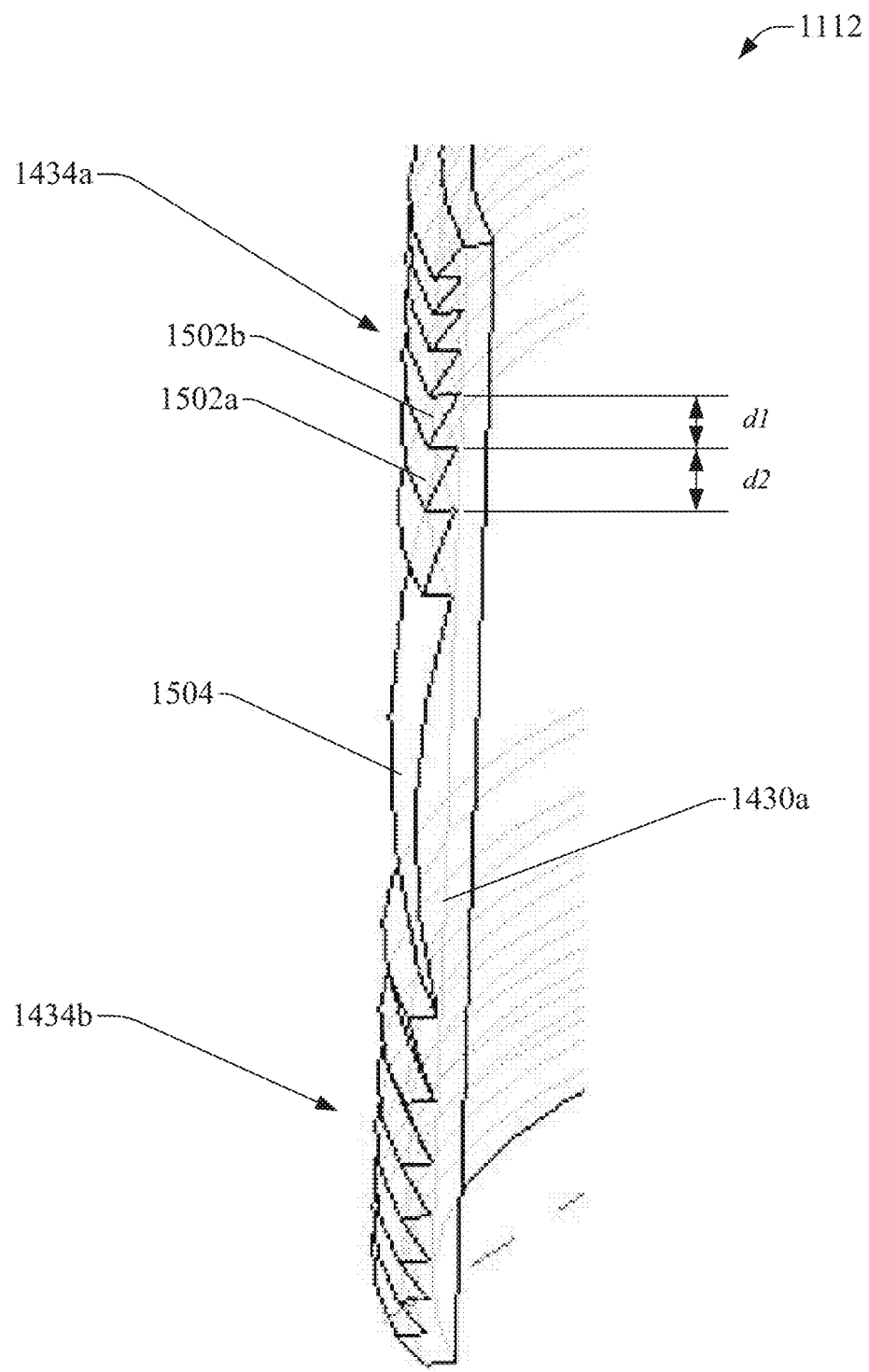
FIG. 15 is a close-up view of a vertical edge of a cylindrical Fresnel lens.

FIG. 15 is a close-up view of vertical edge 1430a illustrating the profile of refractive areas 1434a and 1434b in more detail. In the illustrated example, refractive areas 1434a and 1434b are formed above and below a convex surface 1504 on the outward-facing surface of the lens 1112. Similar to the grooves of the refractive areas 1434a and 1434b, the convex surface 1504 horizontally traverses the middle section of the lens 1112 from the first vertical edge 1430a to the second vertical edge 1430b (or a portion of the distance between the vertical edges). The refractive areas 1434a and 1434b and the convex surface 1504 form a symmetrical cross-sectional profile.

Refractive areas 1434a and 1434b comprise a number of angled refractive surfaces 1502, each of which forms one side of one of the angled grooves. Refractive surfaces 1502 are angled relative to the vertical, with the pitch of each refractive surface 1502 directed toward the convex surface 1504. In the illustrated embodiment, the distances between adjacent grooves of the refractive areas 1434a and 1434b become smaller the farther the grooves are from the convex surface 1504 (e.g., distance d1 is smaller than distance d2, etc.). Similarly, the pitches of the refractive surfaces 1502 become greater the farther the angled surfaces are from the convex surface 1504 (e.g., the pitch of refractive surface 1502b is larger than that of refractive surface 1502a). The angled grooves of refractive areas 1434a and 1434b comprise parallel grooves in non-Euclidean space, in that that the grooves reside in respective parallel planes and thus never intercept one another. It is to be appreciated, however, that other refractive or diffractive formations on the surface of lens 1112, or in the body of lens 1112, are also within the scope of one or more embodiments. For example, in some embodiments the lens surface may comprise non-angled grooves, or grooves with uniform groove spacing. In other embodiments, the parallel grooves can be formed on the inward-facing surface of the lens 1112. In still other embodiments, both the outward- and inward-facing surfaces can be engraved with parallel grooves. In some such embodiments, the two sets of grooves may have radii of curvature complying to a certain shape factor which eliminates coma and minimizes spherical aberrations.

In still other embodiments the outward- and inward-facing surfaces of lens 1112 can be smooth, while the substrate material is infused with dopants, such as certain metals, in a manner creating a gradient refractive index (GRIN) in the bulk of the lens 1112. By forming a quadratically changing GRIN the lens is attributed with dioptric power.

In contrast to some conventional Fresnel lenses, in which grooves are formed as concentric circular grooves, the grooves of example lens 1112 are parallel arches that bend along the arched, cylindrical lens profile. It is to be appreciated that some embodiments of lens 1112 may comprise other types of grooves, such as grooves having a uniform groove depth or a uniform radial distance between grooves. Also, the dioptric power of the arched cylindrical lens 1112 may be realized using other formations in some embodiments, including but not limited to holographic optical elements (HOE).

Although the example depicted in FIG. 14 depicts lens 1112 as having refractive areas 1434a and 1434b comprising parallel refractive surfaces, some embodiments of arched lens 1112 can replace these refractive grooves with diffractive areas in order to produce the disk-like FOI illustrated in FIG. 12. For example, some embodiments of arched lens 1112 can be realized by a diffractive optical element (DOE), such that the angled refractive grooves are replaced by parallel binary structures that traverse the outward-facing surface of the lens 1112 along the curve profile (that is, substantially parallel with upper and lower edges 1436a and 1436b), yielding a diffraction grating that replaces the refractive structure of the lens 1112. In other embodiments, the dioptric lens power can be attributed by diffractive means. The class of diffractive optical elements (DOE) can be either a binary lens, where scaled grooves—which are parallel in this case—are engraved in the substrate, thus modulating the optical path of the rays in the lens and causing their controllable diffraction, or of a lens surface or bulk with alternating refractive index, which modulates the optical phase of the rays in the lens causing their controllable diffraction. The latter can be implemented using holography.

Also, in other embodiments, the refractive surface can be replaced by an imprinted phase pattern (e.g., a holographic optical element, or HOE) formed on the outward-facing or inward-facing surface of the lens 1112, or formed within the bulk of the lens, resulting in a diffraction-based lens function that yields an FOI similar to that depicted in FIG. 12. In yet other embodiments, the HOE can be constructed as a thin film with a holographic pattern glued onto a transparent, dioptrically unpowered lens substrate. In yet other embodiments, the holographic pattern can be imprinted in the bulk of the material. In general, any arched lens having one or more refractive or diffractive optical regions traversing the arched profile of the lens is within the scope of one or more embodiments of this disclosure. Such optical regions—e.g., the refractive areas 1434a and 1434b, areas comprising parallel binary structures, HOEs formed on the surface of the lens or within the bulk of the lens, etc.—can be formed with the ability to focus an incident beam, or collimate an expanding beam, at a high efficiency for a selected diffraction order.

The cylindrical lens 1112 of illuminator 1100 can achieve high illumination transmissivity and minimal exit angle, with minimal scatter of the illumination. For this reason, the lens 1112 can be designed as a thin component having a relatively small depth and pitch. In one or more embodiments, lens 1112 can be made of poly(methyl methacrylate) (PMMA) having the following parameters: radius of 14 mm, conic constant −1, depth of 200 micrometers, and thickness of 2 mm. In other example embodiments, lens 300 can be made of polycarbonate with the following parameters: radius 20 mm, conic constant −1, groove frequency of 2/mm, and thickness of 1.5 mm.

In various embodiments, lens 1112 can be configured to provide illumination conforming to any desired FOI. For example, some embodiments of lens 1112 may be designed to yield an angular expansion of 10×45 degrees, 10×80 degrees, 2×80 degrees, or other desired angular expansions. The expansion of the exiting beam 1114 is the square root of the square sum of the incidence angle and the diffuser expansion angle in the corresponding plane.

Figure 16:
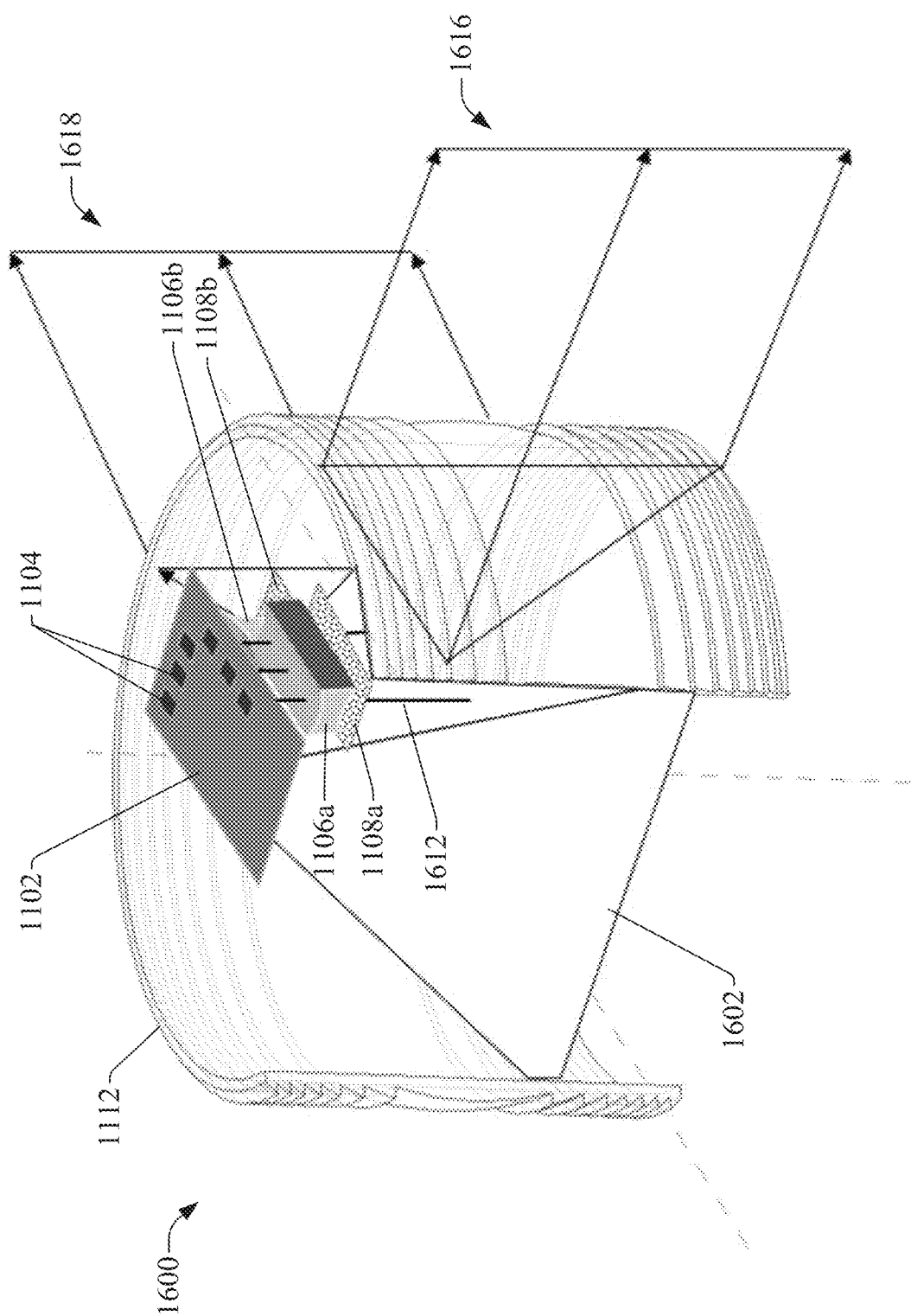
FIG. 16 is a diagram of an example expanded illuminator that yields an FOI of approximately 2×190 degrees by addition of a second elementary unit.

Similar to the compound lens described above, illuminator 1100 can be modularly expanded to widen the FOI. FIG. 16 is a diagram of an example expanded illuminator 1600 that yields an FOI of approximately 2×190 degrees. In this example embodiment, six VCSEL dies 1104 (or another type of light sources) are mounted on horizontal PCB 1102 and radiate vertically downward (substantially parallel to the axis of lens 1112). The six VCSEL dies 1104 are divided into two sets of three VCSEL dies 1104 that are mounted on PCB 1102 such that the two sets are oriented at 90 degrees to one another about a vertical line running through the intersection of the two sets. In the illustrated example, this is achieved by mounting the VCSEL dies 1104 along adjacent edges of the rectangular or square PCB 1102. The emitted radiation from the VCSEL dies 1104 is expanded in the sagittal plane by two negative cylindrical lenses 1106a and 1106b (similar in description to lenses 1106 described above), which are likewise oriented at 90 degrees relative to one another. The negative cylindrical lenses 1106a and 1106b are respectively associated with the two sets of VCSEL dies 1104 such that each of the negative cylindrical lenses 1106a and 1106b receives and expands light from its corresponding set of VCSEL dies 1104. The radiated rays expanded by the negative cylindrical lenses 1106a and 1106b are then diffused by optical diffusers 1108a and 1108b (similar to optical diffuser 1108 described above) mounted below each of the negative cylindrical lenses 1106a and 1106b. Diffusers 1108a and 1108b may be one of refractive or diffractive devices, scattering and homogenizing the received beams in the tangential plane. In one or more embodiments, diffusers 1108a and 1108b may be realized by two lenslet arrays set in tandem to one another, forming a beam homogenizer. In other embodiments, diffusers 1108a and 1108b may be realized by engineered diffusers. In general, diffusers 1108a and 1108b affect the incident beams by expanding beams at the exit.

The radiation beams 1612 from diffusers 1108a and 1108b are folded at 90 degrees by a set of planar mirrors 1602 comprising mirrored surfaces build as a pyramid, such that the axes of the folded beams become substantially parallel to a horizontal plane. The set of planar mirrors 1602 are oriented such that the two radiation beams 1612 from the respective two diffusers 1108a and 1108b are incident on respective two of the mirrored surfaces, causing the two reflected beams to propagate along axes that are 90 degrees from one another. Thus, the two reflected beams are directed to the lens 1112 (e.g., the cylindrical Fresnel lens described above), which collimates the incident beams in the sagittal plane and allows its unperturbed propagation in the horizontal plane as beams 1616 and 1618. These rays represent a subset of all the rays propagating radially relative to the cylindrical lens 1112.

Collectively, the beams 1616 and 1618 yield an FOI of approximately 2×190 degrees through the addition of modular components to illuminator 1100. In this regard, each set of components comprising a negative cylindrical lens 1106, a corresponding diffuser 1108, and a corresponding set of VCSEL dies 1104 that serves as a light source for the negative cylindrical lenses 1106 and diffuser 1108 can be designated an elementary unit, and the FOI can be expanded by installing additional elementary units to illuminator 1100. In the example depicted in FIG. 16, the FOI is expanded to by adding a second elementary unit (comprising negative cylindrical lens 1106*b*, diffuser 1108*b*, and their corresponding set of VCSEL dies 1104) such that the second elementary unit abuts against the first elementary unit (comprising negative cylindrical lens 1106*a*, diffuser 1108*a*, and their corresponding set of VCSEL dies 1104) at 90 degrees.

Figure 17:
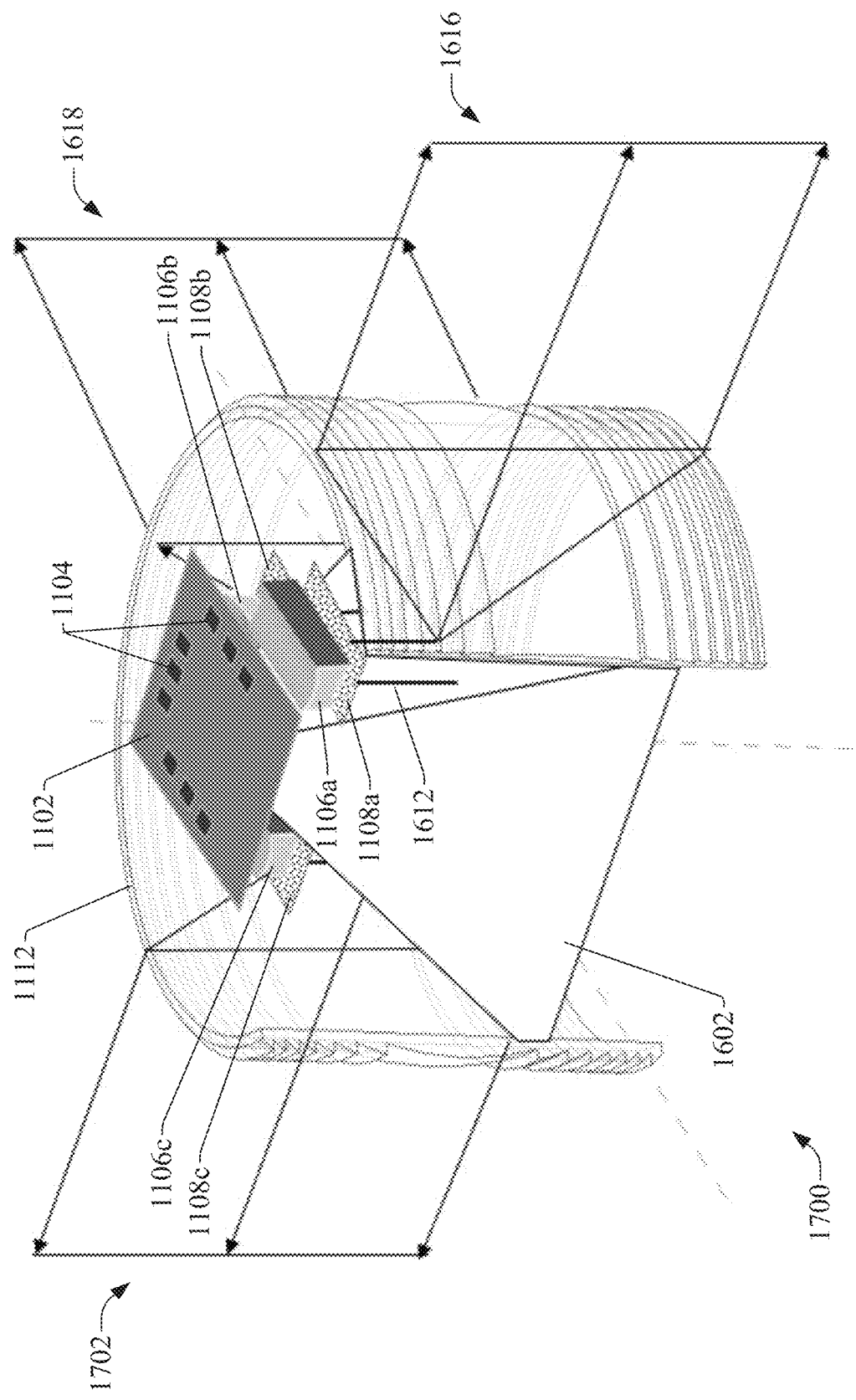
FIG. 17 is a diagram of an example expanded illuminator that yields an FOI of approximately 2×270 by addition of a third elementary unit.

FIG. 17 is a diagram of another example illuminator 1700 that further expands the FOI to 2×270 by addition of a third elementary unit. In this example embodiment, nine VCSEL dies 1104 are mounted on horizontal PCB 1102 and radiate vertically downward. The nine VCSEL dies 1104 are arranged on PCB 1102 such that three sets of three VCSEL dies 1104 are oriented at 90 degrees from one another relative to vertical lines running through the intersections of two adjacent sets (e.g., by mounting the three sets along respective three adjacent sides of a rectangular or square PCB 1102). The emitted radiation from the VCSEL dies 1104 is expanded in the sagittal plane by three negative cylindrical lenses 1106*a*, 1106*b*, and 1106*c*, which are respectively positioned such that each of the negative cylindrical lenses 1106*a*, 1106*b*, and 1106*c* resides below one of the sets of three VCSEL dies 1104 and receives light emitted by its corresponding set of three VCSEL dies 1104.

The radiated rays from the negative cylindrical lenses 1106*a*, 1106*b*, and 1106*c* are then diffused by corresponding optical diffusers 1108*a*, 1108*b*, and 1108*c* respectively positioned below the three negative cylindrical lenses 1106*a*, 1106*b*, and 1106*c*. As in examples described previously, diffusers 1108*a*, 1108*b*, and 1108*c* may be one of refractive or diffractive devices that scatter and homogenize their received beams in the tangential plane. The radiation beams 1612 from the diffusers 1108*a*, 1108*b*, and 1108*c* are directed to respective mirrors of the set of planar mirrors 1602, which fold the beams at 90 degrees such that the axes of the beams become substantially parallel to a horizontal plane. The set of planar mirrors 1602 direct the three resulting radiation beams to lens 1112, which collimates the incident beams in the sagittal plane and allows their unperturbed propagation in the horizontal plane as beams 1616, 1618 and 1702. These rays represent a subset of all the rays propagating radially relative to lens 1112.

Collectively, the beams 1616, 1618, and 1702 yield an FOI of approximately 2×190 degrees through the addition of modular components to illuminator 1100. As shown in FIG. 17, the FOI of 2×270 degrees is achieved by adding a third elementary unit—comprising negative cylindrical lens 1106*c*, diffuser 1108*c*, and their corresponding VCSELs—to the example illuminator 1600 illustrated in FIG. 16. This third elementary unit abuts against the second elementary unit—comprising negative cylindrical lens 1106*b*, diffuser 1108*b*, and their corresponding VCSELs—at -90 degrees.

The FOI can be further expanded to a full 2×360 degrees by adding a fourth elementary unit that abuts against the first and third elementary unit and is directed in the opposite direction to the second elementary unit. To reflect beams from all four elementary units, the set of planar mirrors 1602 can form a reflective pyramid having four sides (the planar mirrors) at 90 degrees to one another and a square base, such that each side is inclined at 45 degrees to the horizon.

In various embodiments, depending on the horizontal angle of projection of the illumination beam (which depends on the number of elementary units in the modular embodiments described above), the collimating lens 1112 can comprise a bent, cylindrical lens (e.g., a cylindrical Fresnel lens) that subtends an angle large enough to accommodate the horizontal projection angle, up to a full circle for 2×360 FOIs.

Figure 18:
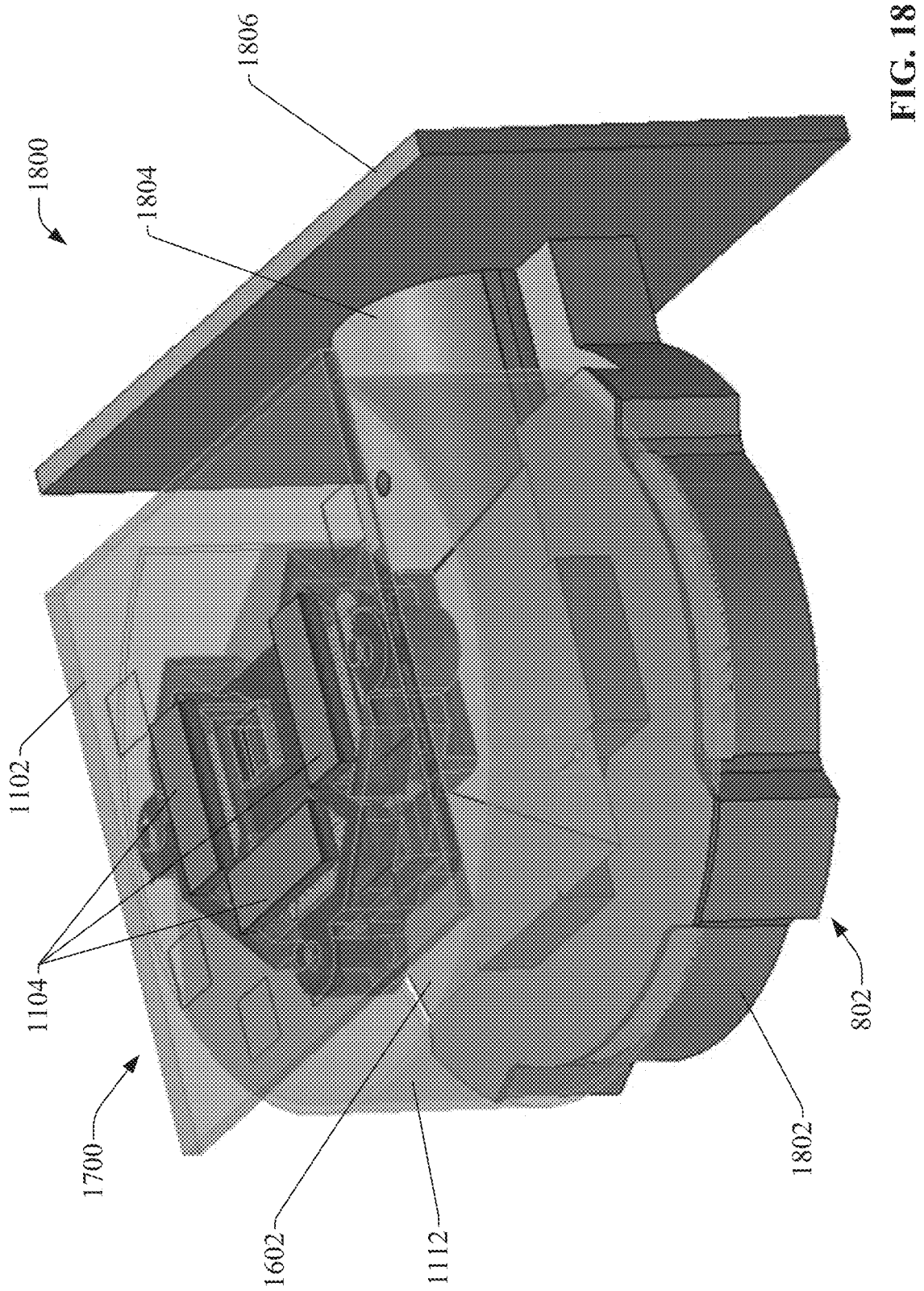
FIG. 18 is a diagram of an example integrated 3D camera and illuminator system.

Embodiments of the modular compound lenses and illuminators described above can be integrated into a camera device, such as a camera device that performs 3D imaging. FIG. 18 is a diagram of an example integrated 3D camera and illuminator system 1800. Example system 1800 is capable of projecting illumination into a FOI of 270×2 degrees and imaging a similar FOV. The example system 1800 comprises illuminator 1700 having the general design described above in connection with FIG. 17, including a PCB 1102 on which three groups of VCSEL dies 1104 (or another type of light source) are mounted, a set of planar folding mirrors 1602, and bent cylindrical collimating lens 1112. System 1800 also includes a camera comprising a compound modular imaging lens 802 as described above in connection with FIG. 8, which images an FOV of 270×2 matching the 270×2 FOI of the illuminator 1700. Visible in FIG. 18 are the frontal lens group 1802 and distal lens group 1804, and a reception PCB 1806 on which the receiving sensor (e.g., sensor 316, not shown in FIG. 18) is mounted. Although example system 1800 utilizes illuminator 1700 and lens 802, corresponding to a 270×2 FOI and FOV, other embodiments of system 1800 may use other embodiments of the illuminator and lens described above, including those that achieve other FOIs and FOVs.

The accuracy of depth measurements performed by 3D cameras depends on the photon flux incident on each pixel of the camera's sensor, which requires a high power illuminator whose beam is emitted into an FOI that snugly overlaps the FOV of the compound modular lens. The high efficiency management of the photon flux afforded by embodiments of the illuminator described above can guarantee that the illumination magnitude is minimal while ensuring a necessary level of quality of the 3D image. Minimizing the illumination magnitude without sacrificing the quality of the 3D image can be beneficial in terms of heat dissipation and eye safety.

Except for an ideal black body, illumination and radiation sources function in general on electric power and generate heat at a rate that depends on the efficiency of a source of photon emission. Solid-state sources such as LEDs, VCSELs, and laser diodes have electric-to-optic conversion efficiencies reaching magnitudes of 30%, 40%, and up to 70%, respectively. Consequently, heat excess of 70%, 60%, and 30%, respectively, of the supplied electrical power must be dissipated. Gas lamps have much lower electric-to-optic conversion efficiencies, and would therefore generate even more heat.

High illumination and radiation powers can pose safety hazard to humans. In particular, the use of various lasers, such as the VCSELs and laser diodes, must be scrutinized before deployment. There are conventional standards that stipulate permissible radiation levels and safety measures that must be taken to mitigate health risks. Example safety measures include compulsory use of safety goggles, limited access to enclosures and rooms, censored use of personal effects, limited exposure time etc. In general, as the emitted power, energy, and irradiance of the illumination source is reduced, compulsory safety measures are permitted to be made less stringent. If the magnitude of the emitted power, energy, and irradiance is sufficiently low, no safety measures need be applied.

In 3D camera and illuminator system 1800, the camera and the illuminator are assembled in such a way as to ensure maximal overlap between the FOV and the FOI nearly from the exit aperture. Owing to long ranges in the FOV and the presence of objects with low reflectivity, the dynamic range (DR) of the 3D camera and illuminator system 1800 is large. In some embodiments, the DR of system 1800 is 120 dB. System 1800 can be built such that the camera and illuminator are sufficiently isolated from one another as to prevent cross talk. For example, some embodiments of system 1800 may implement a two-aperture configuration, such that a first aperture is used for the exit illumination beam 1114 and a second aperture is used for reception of the reflected beam, thereby affording a degree of isolation between the illuminator and lens.

Embodiments of the illuminator described herein (e.g., illuminators 1100, 1600, 1700, or variations thereof) can control the illumination beam to closely conform to a desired FOI. When integrated in system 1800 with a camera having a corresponding embodiment of modular compound lens described herein (e.g., lens 300, 502, 602, 802, or variations thereof) having a FOV closely matching the FOI of the illuminator, a close fit between the FOI and FOV can be achieved by orienting the camera and the illuminator such that their respective FOV and FOI substantially overlap. To ensure that objects in the FOV are imaged with sufficient contrast, which requires proper illumination, the entire FOV of the camera can be subtended by the FOI of the illuminator. In some embodiments, to ensure inclusiveness of all objects in the camera's FOV, the extent of the illuminator's FOI can be set to exceed the extent of the camera's FOV. In such embodiments, the degree to which the FOI exceeds the FOV can be limited to a small degree to maintain high efficiency of the system (e.g., to minimize the amount of unnecessary or wasted illumination). In one or more example embodiments, the FOI of the illuminator can be set to 108×2 degrees and the FOV of the camera can be set to 90×1.5 degrees (relative to the tangential and sagittal planes). In other example embodiments, the illumination can be substantially homogenized over the full FOI, and the relative illumination of the imaging lens can be nearly uniform across the entire FOV. This can be achieved, for example, using an alignment tolerance whereby the camera is within ±9 degrees (150 mr) horizontally and ±0.25 (4 mr) degrees vertically relative to the illuminator.

Embodiments of camera and illumination system 1800 and the components thereof described herein can be integrated components of an industrial optical safety device, such as a laser scanner or a light guard. In such applications, embodiments of the illuminator described herein can be used to efficiently direct light to a monitored industrial area, and embodiments of the modular compound lens described herein can collect the resulting scattered light from the field of view and direct the light to camera sensor equipment configured to detect presence of people or objects within the monitored area based on measurements of the illumination (e.g., by measuring a portion of the scattered illumination reflected from the person or object). System 1800 can also be used to direct and receive laser light in laser radar (Lidar) systems.

Figure 19:
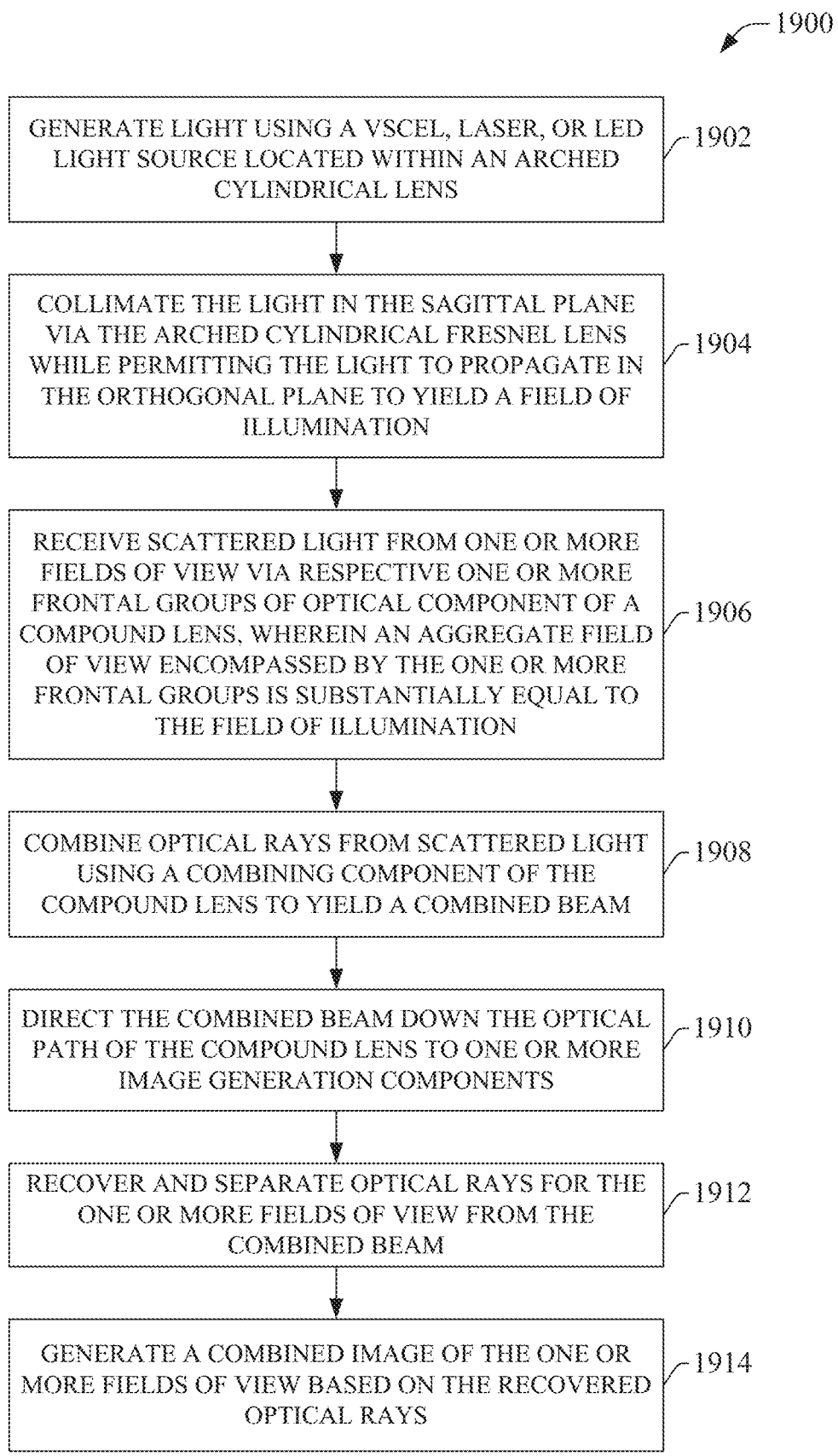
FIG. 19 is a flowchart of an example methodology for imaging a field of view.

FIG. 19 illustrates a methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 19 illustrates an example methodology for imaging a field of view. Initially, at 1902, light is generated using a light source device—e.g., a VCSEL, laser, or LED light source—located within an arched cylindrical lens (e.g., an arched cylindrical Fresnel lens). The lens can have a curved profile of substantially any arched shape, including but not limited ty cylindrical, elliptical, parabolic, hyperbolic, or a freeform arched shape. At 1904, the light generated at step 1902 is collimated in the sagittal plane by the arched cylindrical lens while being permitted to propagate in the orthogonal plane with little or no refraction of the light rays, thereby yielding an FOI having a disk-like shape (or a disk sector). In an example implementation, the light generated at step 1902 can be collimated in the tangential plane and expanded in the sagittal plane using a negative cylindrical lens located on or near the axis of the arched cylindrical lens to yield first collimated light. This first collimated light is homogenized and expanded by an optical diffuser also located on the axis of the arched cylindrical lens, and this homogenized light is folded and directed to the inner surface of the arched cylindrical lens by a folding mirror, which performs the collimating at step 1904. Collimation by the arched lens can be achieved using one or more of refractive grooves or diffraction gratings formed on the lens, or by holographic phase patterns formed on a surface of the lens or within the bulk of the lens.

At 1906, scattered light from one or more fields of view is received via a respective one or more frontal groups of optical components of a compound lens. The frontal groups may each comprise, for example, primary and secondary lenses of the compound lens directed to one of the fields of view. The aggregate field of view encompassed by the one or more frontal groups (that is, the aggregation of the one or more fields of view collected by the respective one or more frontal groups) can be substantially equal to the field of illumination encompassed by the collimated light propagated at step 1904, thereby minimizing wasted light energy and facilitating highly efficient performance of the imaging system.

At 1908, optical rays from the scattered light received at step 1906 is combined using a combining component of the compound lens to yield a combined beam. The combining component may comprise, for example, a dichroic beam-splitting cube, a polarizing beamsplitter cube, a steering mirror or opto-electric valve that combines the optical rays by time-interleaving the light received from the one or more frontal groups of optical components, or another type of combining element. At 1910, the combined beam is directed down the optical path of the compound lens to one or more image generation components. The optical path may comprise a number of other powered optical elements oriented between the combining element and the image generation components.

At 1912, optical rays for the one or more fields of view is recovered and separated from the combined beam. For example, if a dichroic or polarizing beamsplitter cube was used to combine the optical rays at step 1908, a complimentary beamsplitter cube can be used to separate the optical rays from the combined beam. At 1914, a combined image of the one or more fields of view is generated based on the recovered optical rays.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims. For instance, all the lenses described above may be either refractive lenses, refractive Fresnel lenses, binary lenses, diffractive lenses, holographic optical elements or a combination of such lenses.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for imaging a field of view, comprising:
   an illuminator comprising:
      a light source assembly, and
      an arched cylindrical lens that arches about an axis to yield a hollow cylindrical shape, wherein the arched cylindrical lens is refractive or diffractive, and the arched cylindrical lens is configured to collimate light from the light source assembly in a first plane and to allow undisturbed or substantially undisturbed propagation of the light in a second plane that is orthogonal to the first plane to yield an illumination beam; and
   a modular compound lens comprising:
      a plurality of frontal groups of optical components configured to collect and refract scattered light from a respective plurality of fields of view to yield refracted light, and
      a combining component configured to receive the refracted light from the plurality of frontal groups of optical elements and to direct the refracted light to one or more distal optical elements along an optical path of the modular compound lens,
   wherein
   the plurality of frontal groups of optical components are oriented substantially at right angles to one another about the combining component, and
   an aggregate of the plurality of fields of view collected by the plurality of frontal groups of optical components is equal to or substantially equal to a field of illumination of the illumination beam and overlaps or substantially overlaps with the field of illumination.

2. The system of claim 1, wherein the plurality of frontal groups of optical components comprise two frontal groups oriented at right angles to one another about the combining component to yield an aggregate field of view of at least 190 degrees.

3. The system of claim 1, wherein the plurality of frontal groups of optical components comprise three frontal groups oriented at right angles to one another about the combining component to yield an aggregate field of view of at least 270 degrees.

4. The system of claim 1, wherein each frontal group, of the plurality of frontal groups of optical components, comprises
   a primary lens configured to collect and refract first light from a first field of view of the plurality of fields of view to yield first refracted light, and
   a secondary lens configured to refract the first refracted light from the primary lens to yield second refracted light.

5. The system of claim 4, wherein the combining component is further configured to
   receive the second refracted light from the plurality of frontal groups of optical components as respective received beams,
   combine the received beams into a combined beam, and
   direct, as the refracted light, the combined beam to the one or more distal optical elements along the optical path of the modular compound lens.

6. The system of claim 5, wherein the combining component is configured to combine the received beams using at least one of wavelength diversification or polarity diversification.

7. The system of claim 5, wherein
   the combining component is tilted relative to an optical axis of the one or more distal optical elements causing the plurality of fields of view to be projected onto respective different zones of an image plane of a sensor.

8. The system of claim 1, wherein the light source assembly is located at or near a focus of a curved profile of the arched cylindrical lens, and comprises:
an array of light sources that emit source light substantially parallel to the axis of the arched cylindrical lens,
one or more negative cylindrical lenses that collect the source light from the array of light sources and expand the source light in at least one plane to yield expanded light,
one or more diffusers respectively associated with the one or more negative cylindrical lenses, wherein the one or more diffusers are configured to homogenize the expanded light from the one or more negative cylindrical lenses to yield homogenized light, and
one or more folding mirrors respectively associated with the one or more negative cylindrical lenses, wherein the one or more folding mirrors are configured to reflect, as the light from the light source assembly, the homogenized light toward the arched cylindrical lens.

9. The system of claim 8, wherein
the one or more negative cylindrical lenses comprise multiple negative cylindrical lenses, and
adjacent negative cylindrical lenses of the multiple negative cylindrical lenses are oriented at approximately 90 degree angles to one another.

10. The system of claim 1, further comprising one or more imaging sensors, wherein the one or more distal optical elements are configured to focus modulated light from the plurality of fields of view to the one or more imaging sensors, and the one or more imaging sensors are configured to generate a three-dimensional image of the plurality of fields of view based on analysis of the modulated light.

11. The system of claim 1, wherein the one or more distal optical elements comprise at least a bandpass filter configured to pass wavelength ranges for the plurality of fields of view and to reject ambient background radiation.

12. A method for imaging a field of view, comprising:
generating light by a light source assembly located at or near a focus of a curved profile of an arched cylindrical lens having a curved profile that arches about an axis;
receiving, by the arched cylindrical lens, the light generated by the light source assembly, wherein the arched cylindrical lens is one of refractive or diffractive;
collimating, by the arched cylindrical lens, the light in a first plane while allowing propagation of the light in a second plane that is orthogonal to the first plane to yield an illumination beam projected into a viewing space;
receiving, by frontal groups of optical components of a modular compound lens, a subset of the illumination beam as scattered light from respective fields of view, wherein the frontal groups are orientated at substantially right angles to one another about a combining component of the modular compound lens, and an aggregate of the fields of view is equal or substantially equal to a field of illumination of the illumination beam and overlaps or substantially overlaps with the field of illumination;
refracting, by the frontal groups of optical components, the scattered light to yield refracted light;
receiving, by the combining component of the modular compound lens, the refracted light from the frontal groups; and
directing, by the combining component, the refracted light to one or more distal optical elements along an optical path of the modular compound lens.

13. The method of claim 12, wherein the refracting the scattered light comprises:
refracting, by a primary lens of each frontal group of the frontal groups, a subset of the scattered light from a first field of view of the fields of view to yield first refracted light; and
refracting, by a secondary lens of each frontal group of the frontal groups, the first refracted light from the primary lens to yield second refracted light.

14. The method of claim 13, further comprising:
receiving, by the combining component, the second refracted light from the frontal groups of optical components as respective received beams; and
combining, by the combining component, the received beams into a combined beam,
wherein the directing comprises directing, by the combining component as the refracted light, the combined beam to the one or more distal optical elements along the optical path of the modular compound lens.

15. The method of claim 14, wherein the combining comprises combining the received beams using at least one of wavelength diversification or polarity diversification.

16. The method of claim 12, wherein the generating the light comprises:
emitting, by one or more light sources, source light substantially parallel to the axis of the arched cylindrical lens;
expanding, by one or more negative cylindrical lenses, the source light in at least one plane to yield expanded light;
homogenizing, by one or more diffusers respectively associated with the one or more negative cylindrical lenses, the expanded light to yield homogenized light; and
reflecting, by one or more folding mirrors respectively associated with the one or more negative cylindrical lenses, the homogenized light toward the arched cylindrical lens to yield the light generated by the light source assembly.

17. The method of claim 12, wherein the directing comprises focusing, by the one or more distal optical elements, the refracted light as modulated light to one or more imaging sensors; and
generating, by the one or more imaging sensors, a three-dimensional image of the aggregate of the fields of view based on analysis of the modulated light.

18. A method of manufacturing an imaging camera, comprising:
disposing a light source assembly at or near a focus of a curved profile of an arched cylindrical lens, wherein the arched cylindrical lens is one of refractive or diffractive and is configured to collimate light from the light source assembly in a first plane and to allow undisturbed or substantially undisturbed propagation of the light in a second plane that is orthogonal to the first plane to yield a field of illumination;
installing a modular compound lens, wherein the installing comprises:
installing a distal group of optical components;
installing a plurality of frontal groups of optical components oriented at substantially right angles to one another about a combining component, wherein the combining component is configured to combine rays from the plurality of frontal groups to yield a combined ray and to direct the combined ray to the distal group of optical components; and orienting the modular compound lens to collect and refract scattered light from a plurality of fields of view collected by the plurality of frontal groups to yield refracted light and to direct the refracted light to one or more imaging sensors, wherein an aggregate of the plurality of fields of view is equal to or substantially equal to the field of illumination and overlaps or substantially overlaps with the field of illumination.

19. The method of claim 18, wherein each frontal group, of the plurality of frontal groups, comprises a primary lens configured to collect and refract first light from a first field of view to yield first refracted light, and a secondary lens configured to refract the first refracted light from the primary lens to yield second refracted light.

20. The method of claim 19, wherein the combining component is further configured to receive the second refracted light from the plurality of frontal groups of optical components as respective received beams, combine the received beams into a combined beam, and direct, as the refracted light, the combined beam to the distal group along an optical path of the modular compound lens.

* * * * *